Sept. 4, 1956 H. G. ALLEN ET AL 2,761,540
CONVEYOR FOR COLLAPSIBLE TUBE FINISHING MACHINE
Filed June 10, 1949 18 Sheets-Sheet 1

INVENTORS.
Howard G. Allen &
Charles B. Thomas
BY
Pennie, Edmonds, Morton & Barrows
Attorneys.

Sept. 4, 1956         H. G. ALLEN ET AL         2,761,540
CONVEYOR FOR COLLAPSIBLE TUBE FINISHING MACHINE
Filed June 10, 1949                           18 Sheets-Sheet 2

INVENTOR.
Howard G. Allen
Charles D. Thomas
BY
Pennie, Edmonds, Morton & Barrows
Attorneys.

Sept. 4, 1956  H. G. ALLEN ET AL  2,761,540
CONVEYOR FOR COLLAPSIBLE TUBE FINISHING MACHINE
Filed June 10, 1949  18 Sheets-Sheet 4

INVENTOR.
Howard G. Allen & Charles D.
BY Thomas
Purnie, Edmonds, Morton & Barrows
Attorneys.

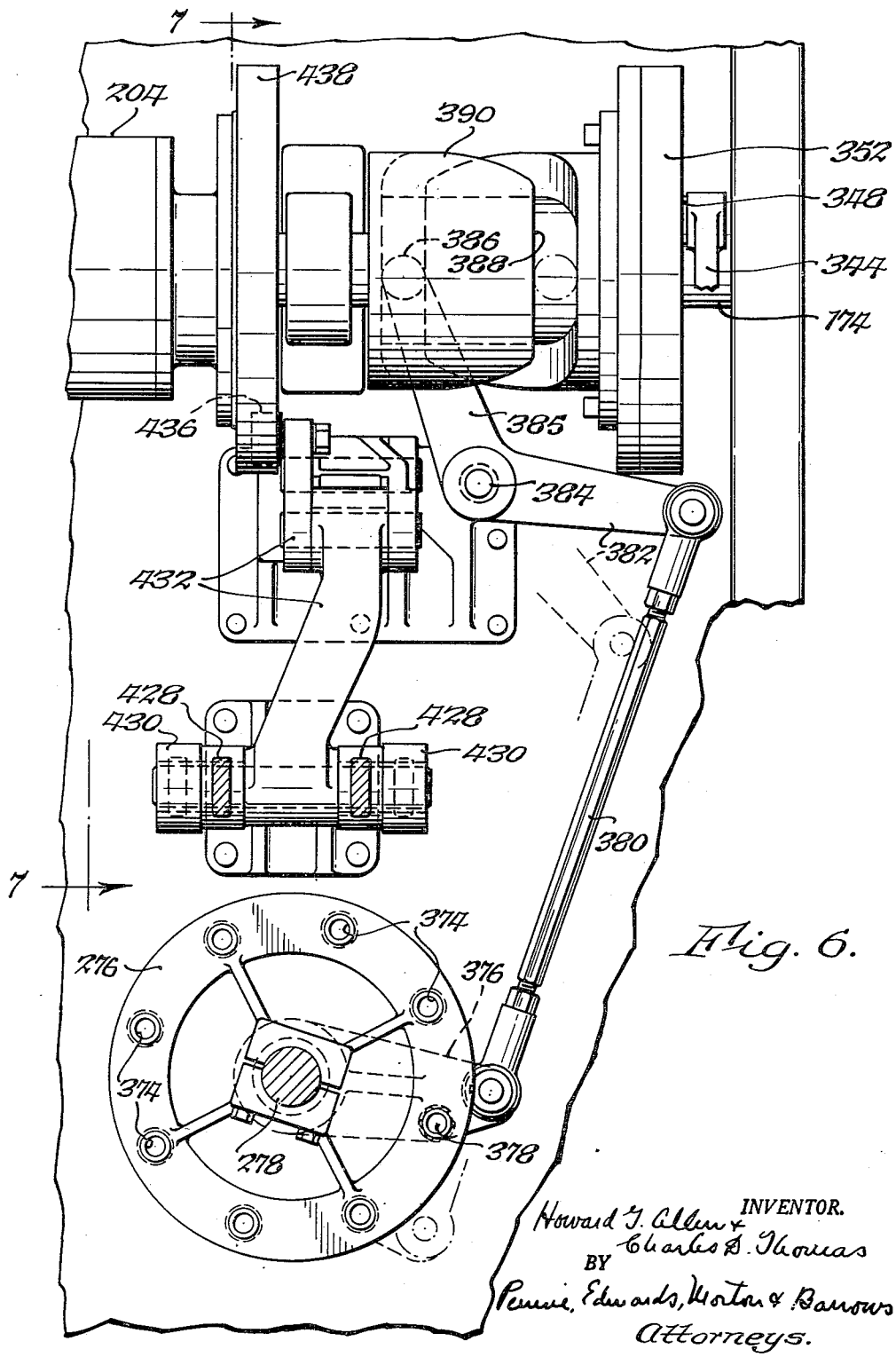

Sept. 4, 1956 H. G. ALLEN ET AL 2,761,540
CONVEYOR FOR COLLAPSIBLE TUBE FINISHING MACHINE
Filed June 10, 1949 18 Sheets-Sheet 6
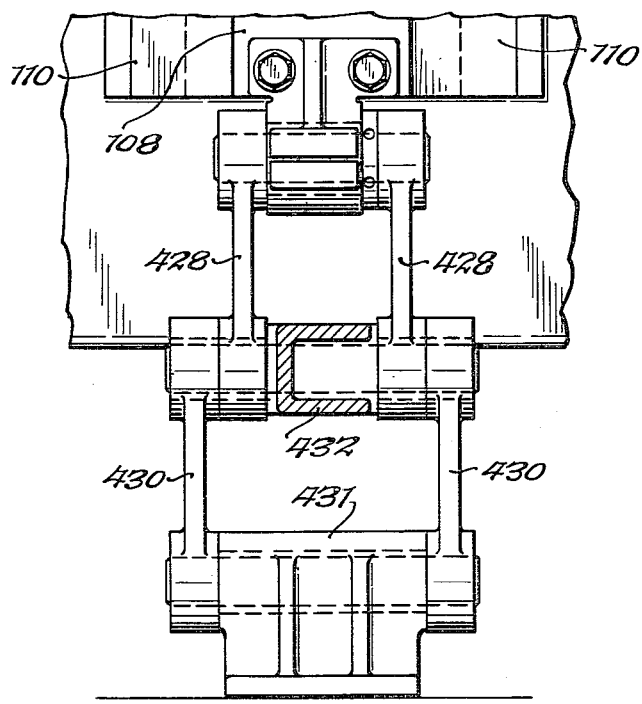
Fig. 8.
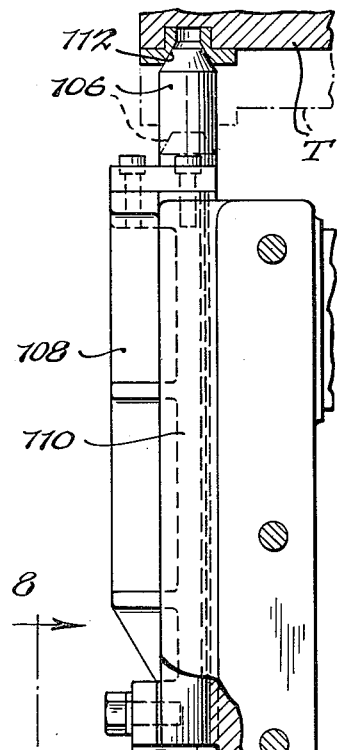
Fig. 7.
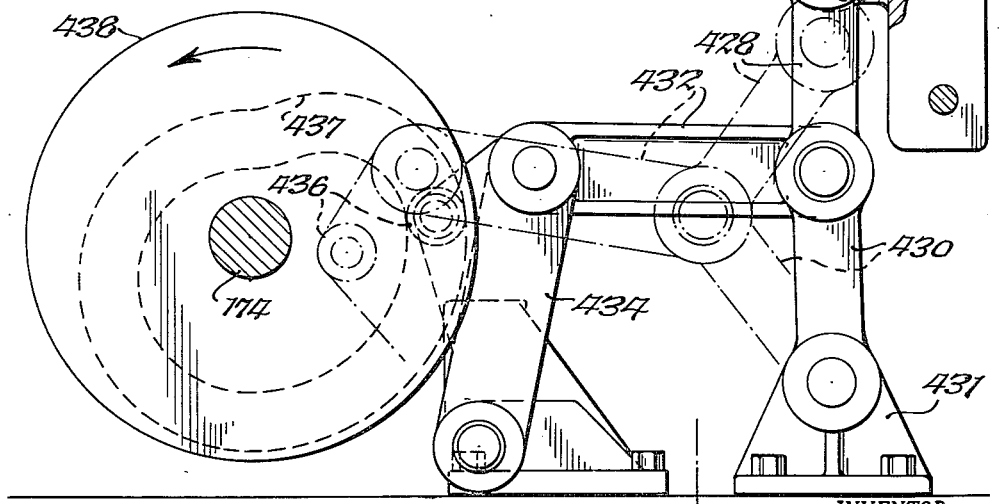
INVENTOR.
Howard G. Allen & Charles D. Thomas
BY
Pennie, Edmunds, Morton & Barrows
Attorneys.

Sept. 4, 1956        H. G. ALLEN ET AL        2,761,540
CONVEYOR FOR COLLAPSIBLE TUBE FINISHING MACHINE
Filed June 10, 1949        18 Sheets-Sheet 8
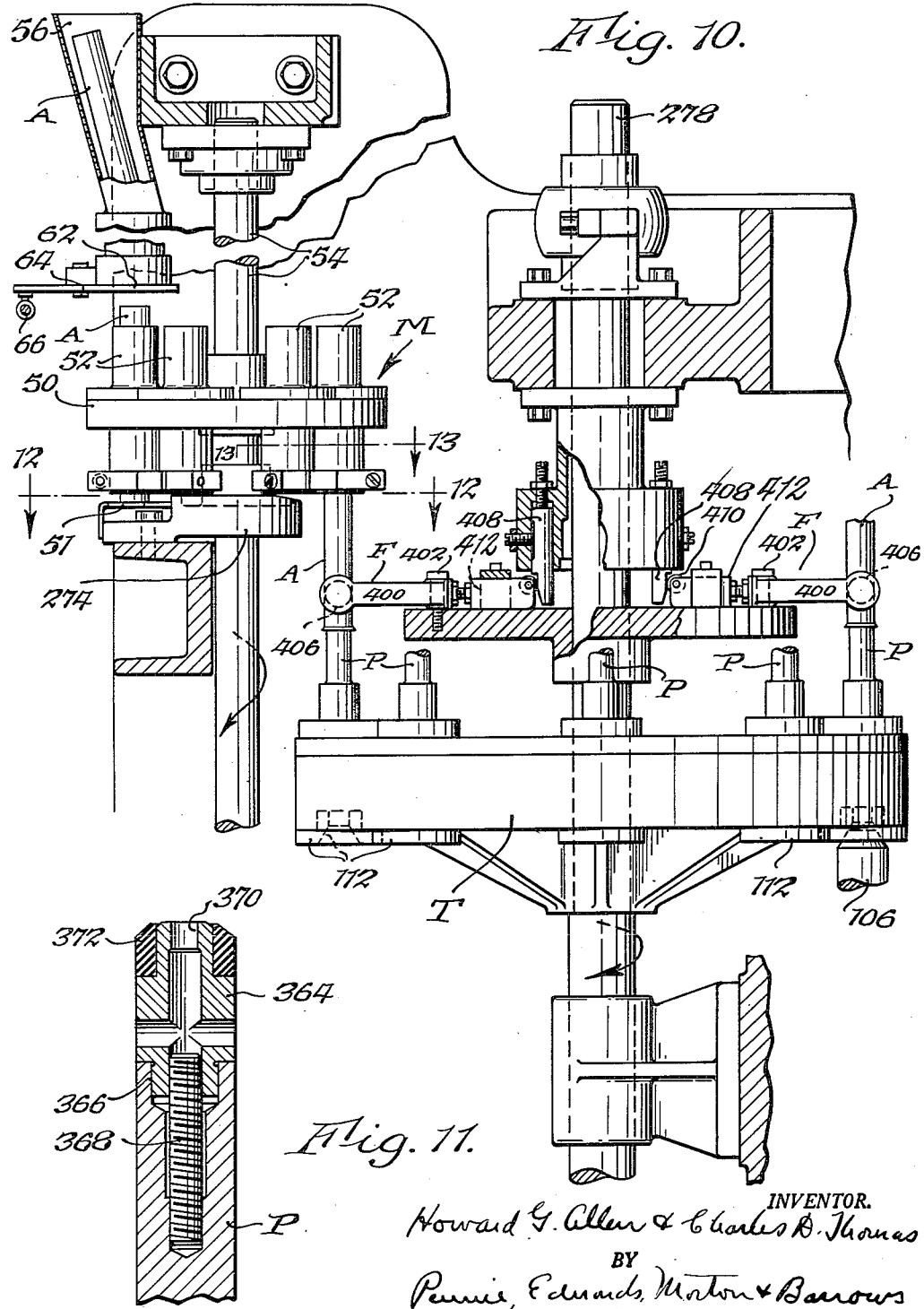
INVENTOR.
Howard G. Allen & Charles D. Thomas
BY
Pennie, Edmunds, Morton & Barrows
Attorneys.

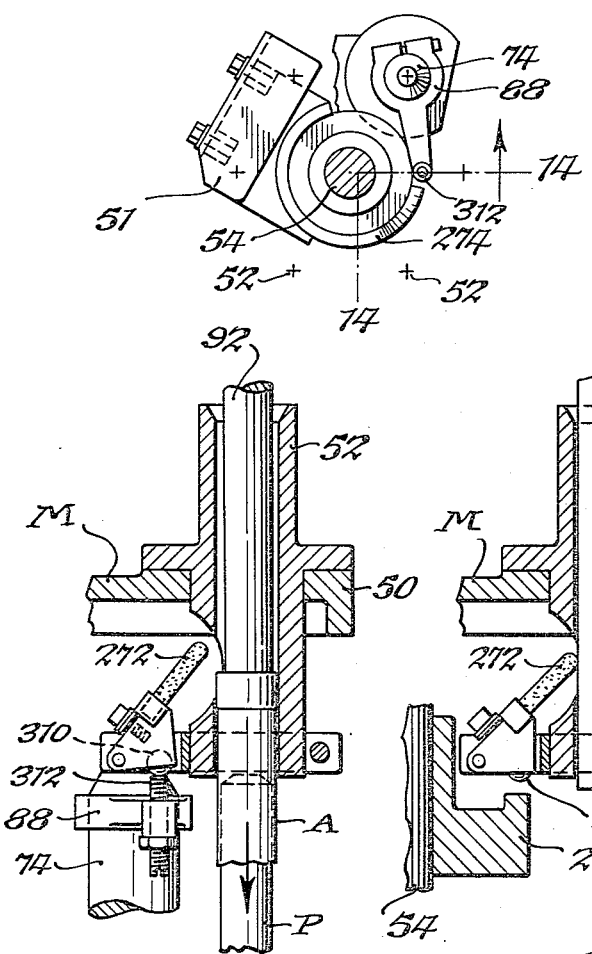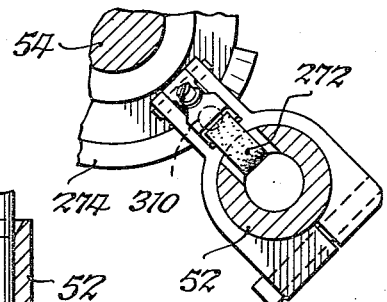

Sept. 4, 1956 H. G. ALLEN ET AL 2,761,540
CONVEYOR FOR COLLAPSIBLE TUBE FINISHING MACHINE
Filed June 10, 1949 18 Sheets-Sheet 10
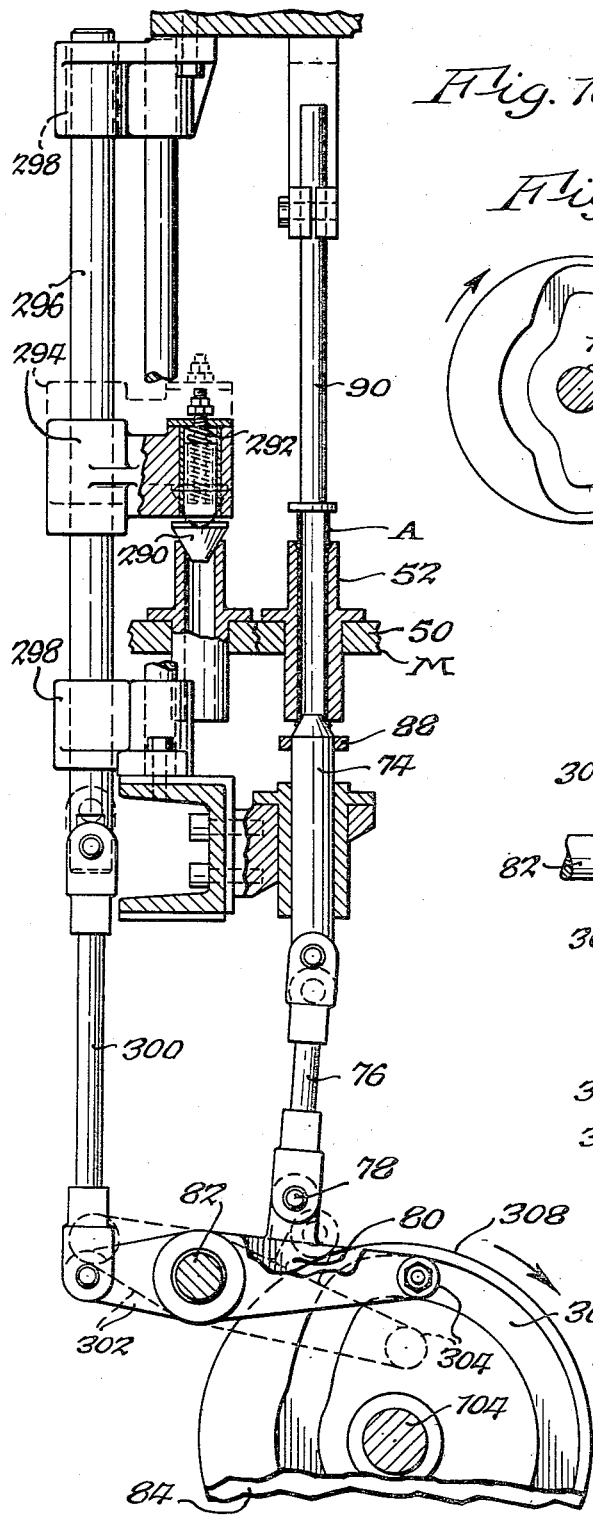
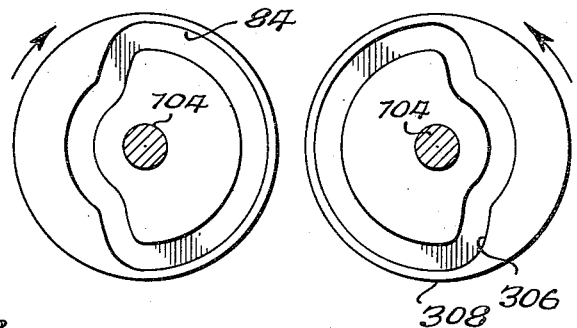
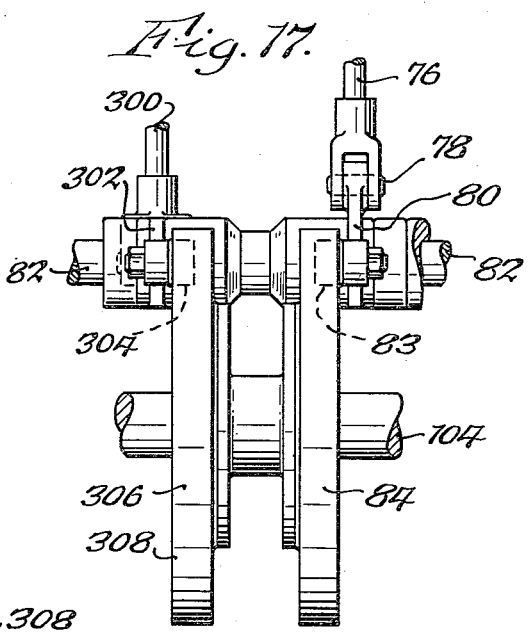

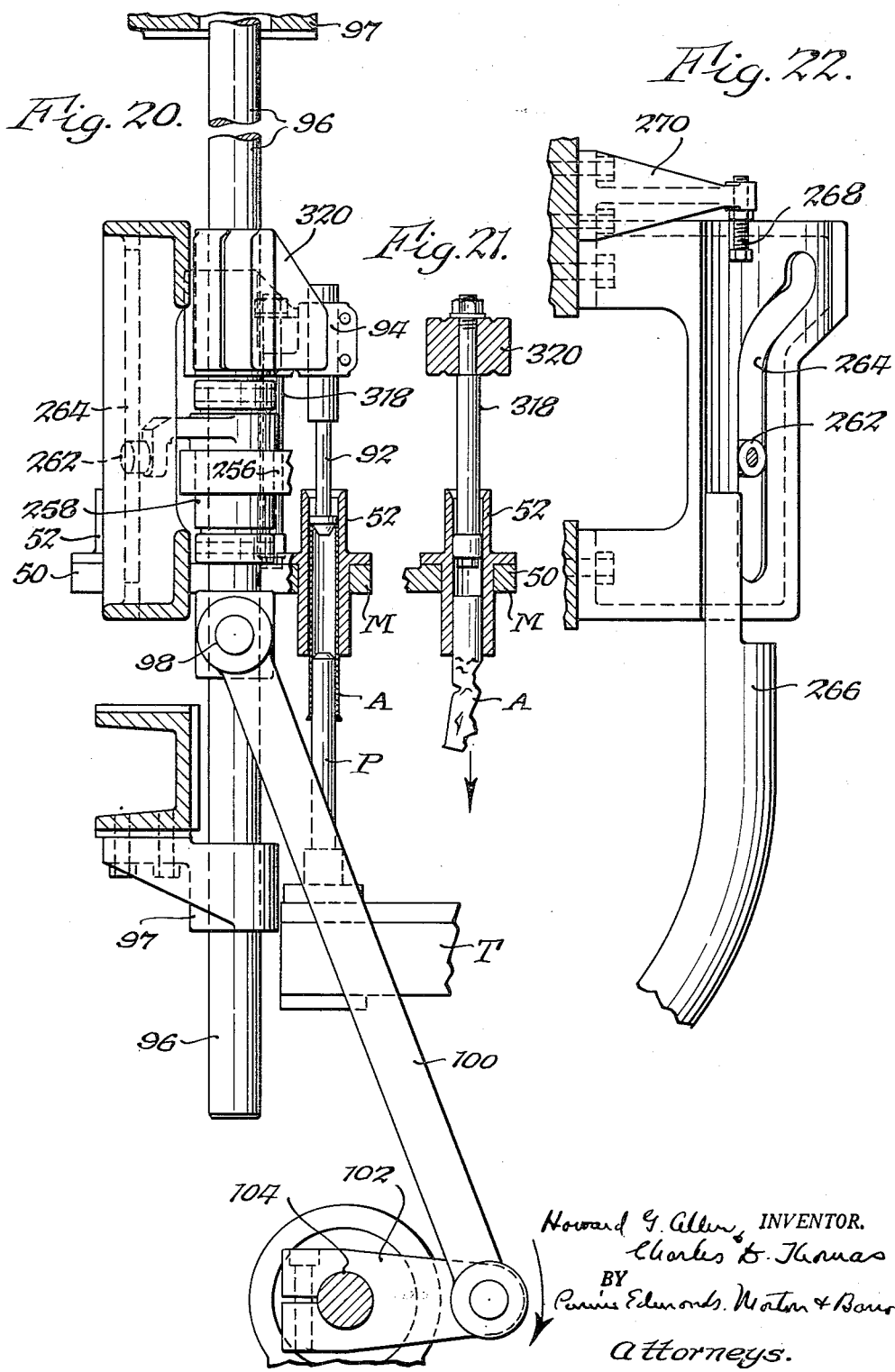

Sept. 4, 1956 H. G. ALLEN ET AL 2,761,540
CONVEYOR FOR COLLAPSIBLE TUBE FINISHING MACHINE
Filed June 10, 1949 18 Sheets-Sheet 12

INVENTOR.
Howard G. Allen &
BY Charles D. Thomas
Pirie, Edmonds, Morton & Barrows
Attorneys.

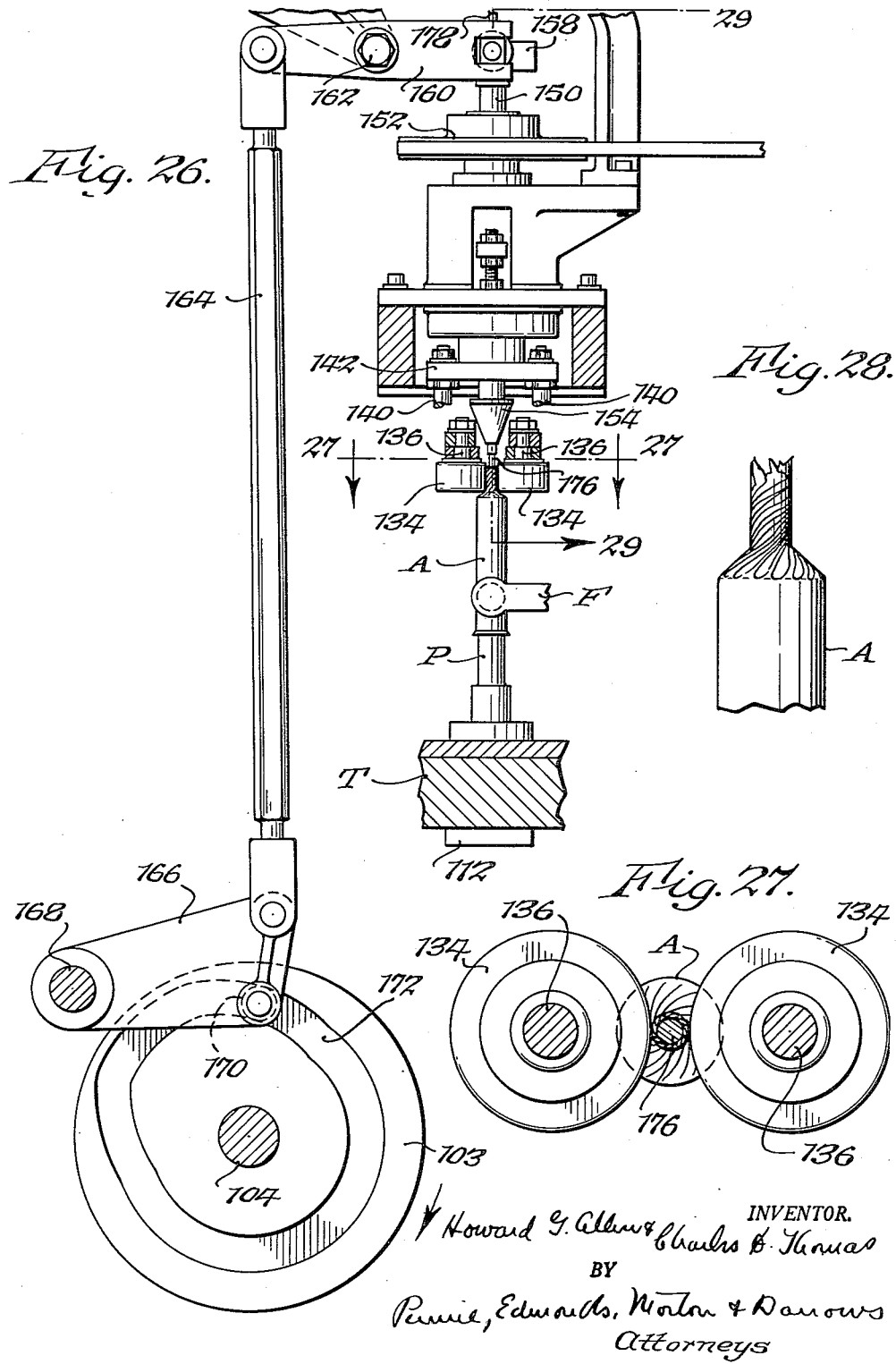

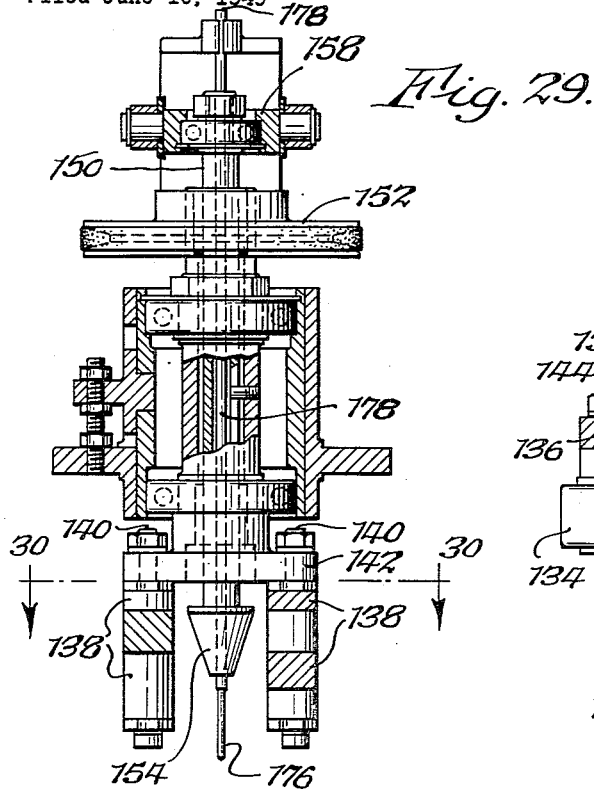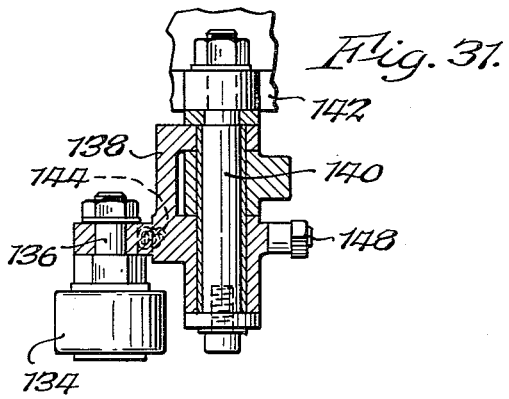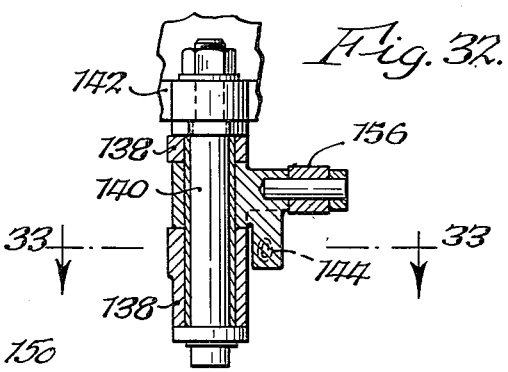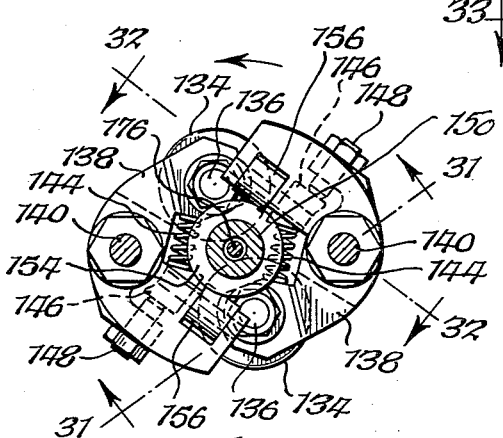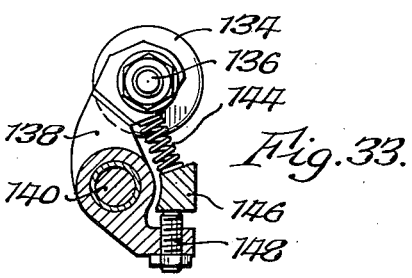

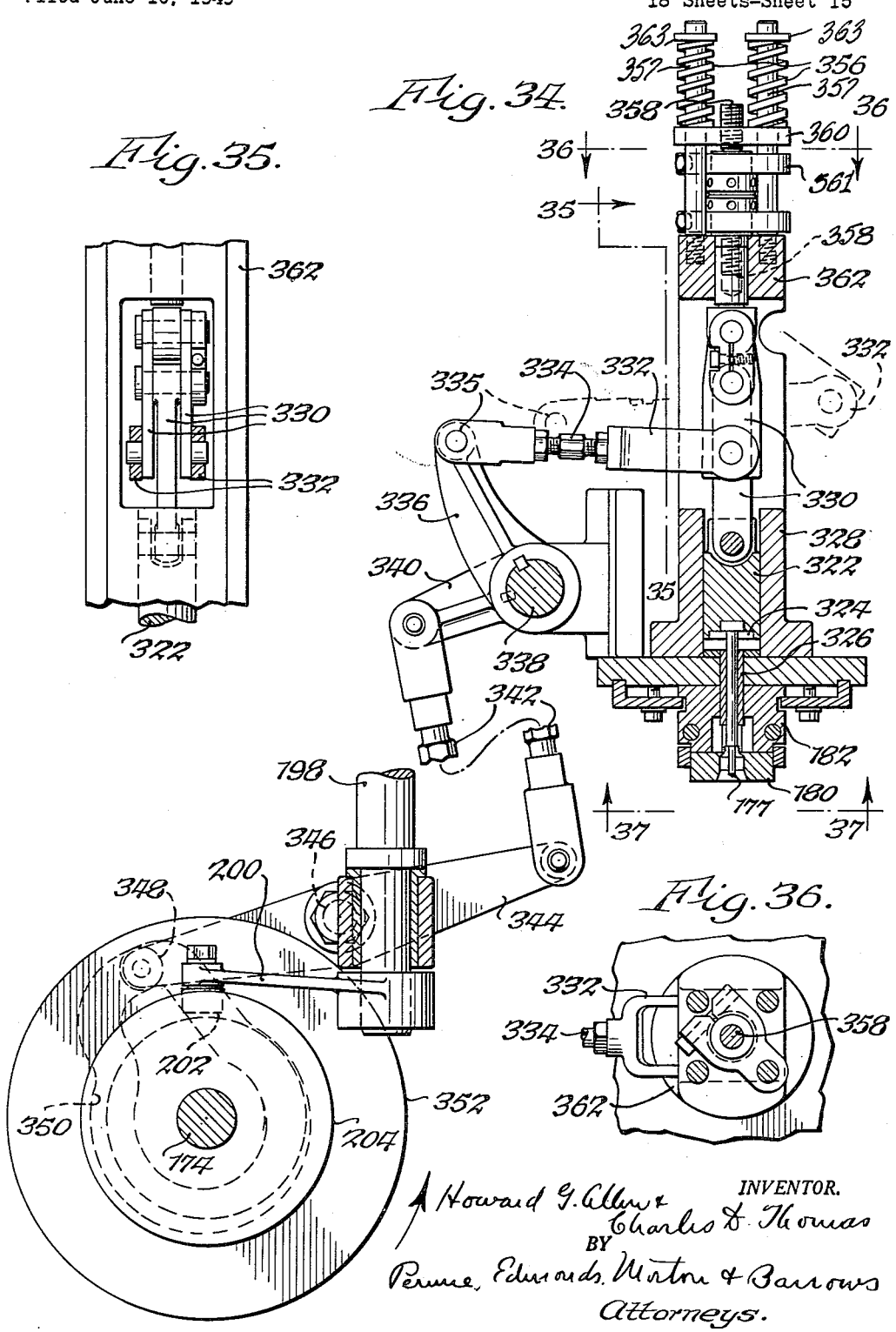

Sept. 4, 1956　　　H. G. ALLEN ET AL　　　2,761,540
CONVEYOR FOR COLLAPSIBLE TUBE FINISHING MACHINE
Filed June 10, 1949　　　　　　　　　　　　18 Sheets-Sheet 16

INVENTOR.
Howard G. Allen & Charles D. Thomas
BY
Pennie, Edmonds, Morton & Barrows
Attorneys.

Sept. 4, 1956 H. G. ALLEN ET AL 2,761,540
CONVEYOR FOR COLLAPSIBLE TUBE FINISHING MACHINE
Filed June 10, 1949 18 Sheets-Sheet 17
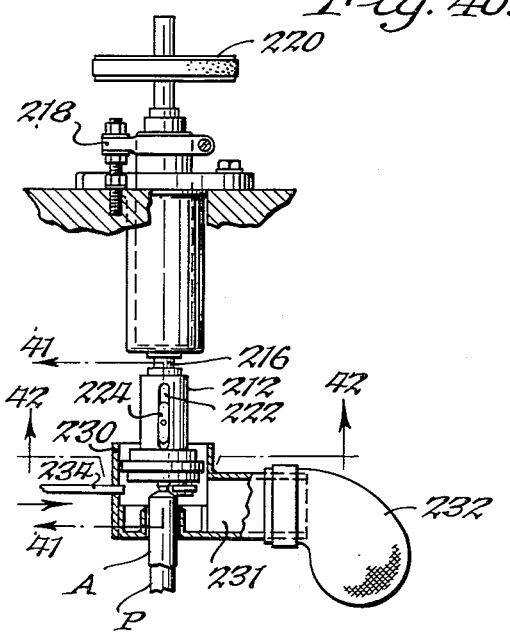
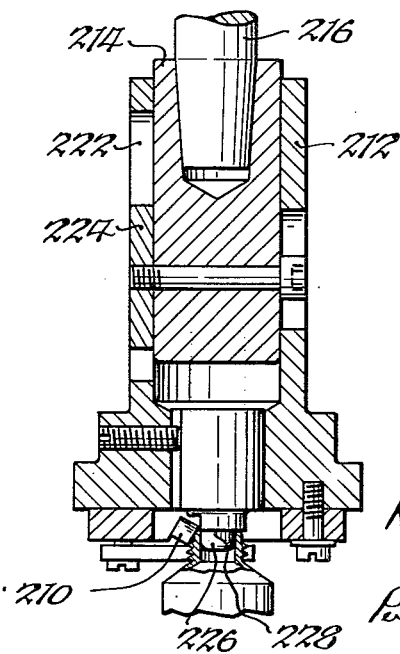
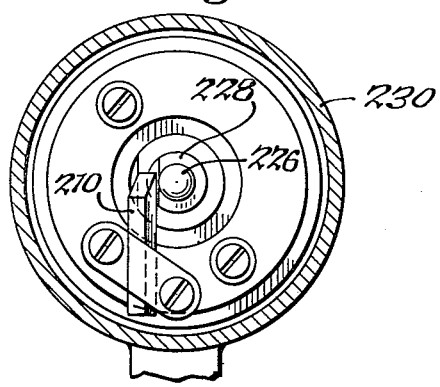
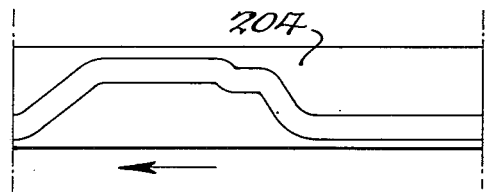

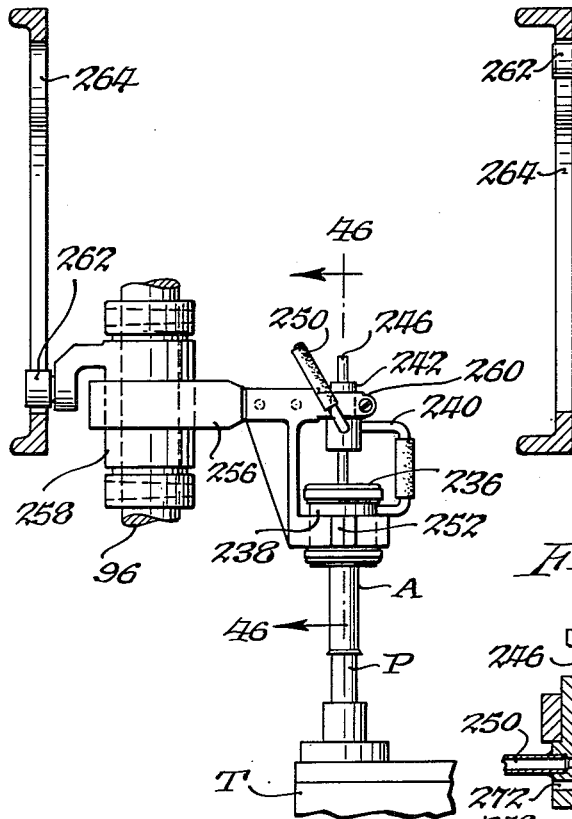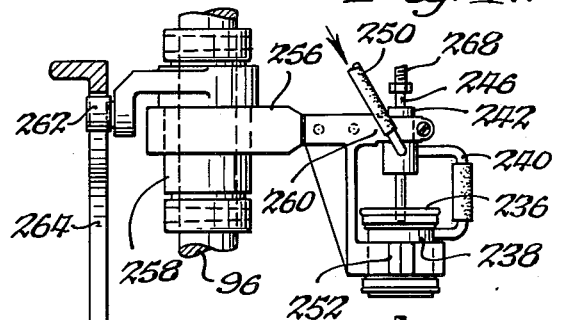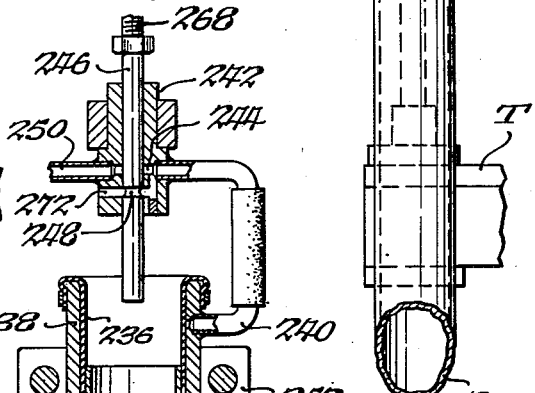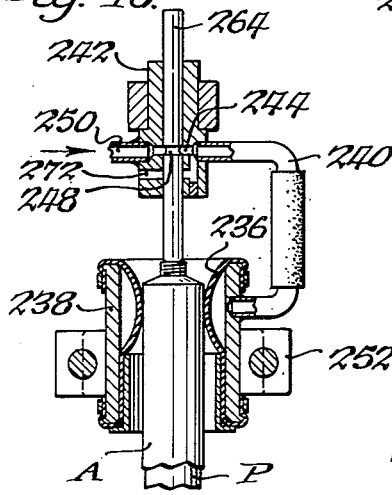

United States Patent Office
2,761,540
Patented Sept. 4, 1956

2,761,540

CONVEYOR FOR COLLAPSIBLE TUBE FINISHING MACHINE

Howard G. Allen, Niagara Falls, and Charles D. Thomas, Hamburg, N. Y., assignors to Daystrom Incorporated, a corporation of New Jersey Application June 10, 1949, Serial No. 98,216

9 Claims. (Cl. 198—19)

This invention relates to a machine for forming tubes and more particularly to a machine for forming the shoulder and neck of a collapsible tube integral with a cylindrical or tubular body.

In the prior patent to Boris Bogoslowsky #2,396,635, granted March 19, 1946, there is disclosed and claimed a collapsible tube comprising a flexible, cylindrical tubular portion and an integral shoulder and neck in which the shoulder extends inwardly from the tubular portion and consists of a multiplicity of small folds and in which the neck consists of continuations of the folds of the shoulder which have been shortened in length to provide a compressed thickened tubular wall of substantial strength and rigidity.

The present invention is directed to apparatus for producing tubes of the type disclosed in the said Bogoslowsky patent. In forming such tubes, one end of the body is first submitted to a preliminary crimping operation, it is then rolled to form the neck and carry forward the formation of the shoulder, and it is then submitted to a final pressing operation in a die to complete the formation of the shoulder and neck and form threads on the neck for the reception of the cap.

The present invention relates to a machine for performing these various functions and other functions.. It comprises a turret or turntable having a plurality of posts or mandrels to receive the tubes with means for imparting a step by step movement to the turntable with a dwell at each station long enough to perform the intended operation. It further comprises means for feeding the tubular bodies to the turntable and means for removing the finished tube.

The invention also comprises certain sub-combinations of indexing means, locking and positioning means and sub-combinations of drive means by which the various functions are performed. The machine includes a tube body receiving mechanism or magazine which is rotatably mounted so as to be operated step by step by suitable indexing mechanism so that cylindrical tube bodies can be dropped into a station of this magazine, one after another, in timed relation to the step movements of the magazine.

Some preliminary operations are performed on the bodies in this magazine and at a prescribed station the bodies are delivered from the magazine to the turntable which is also turned step by step by suitable indexing mechanism to carry the tube bodies through successive stations whereby the tube bodies are ultimately finished. They then arrive at a discharge station where they are ejected from the machine.

In the accompanying drawings we have shown one embodiment of the invention. In this showing:

Fig. 6 is a horizontal section on line 6—6 of Fig. 4, illustrating further the table indexing mechanism and part of the table lift mechanism;

Fig. 7 is a vertical section on line 7—7 of Fig. 6, showing the table raising mechanism and the lift cam therefor;

Fig. 8 is a vertical section on line 8—8 of Fig. 7, showing toggle links forming part of the slide or cross-head of the table lift mechanism;

Fig. 10 is a fragmentary side elevation of the mechanism illustrated in Fig. 9, parts being broken away for clarity;

Fig. 11 is a vertical, detail section through one of the table mandrels [of which there are eight];

Fig. 12 is a horizontal section taken on line 12—12 of Fig. 10, showing a portion of the load station of the magazine;

Fig. 13 is a horizontal section on line 13—13 of Fig. 10 showing one of the fingers for holding a tube body in the magazine;

Fig. 14 is a vertical section through a tube holder of the magazine with the finger in released position, and the releasing means therefor mounted on the flaring tool;

Fig. 15 is a similar section, showing the tube holding finger in tube holding position;

Fig. 16 is a vertical section on line 16—16 of Fig. 9, illustrating part of the tube feeding magazine in position for flaring a tube, and the means for effecting accurate positioning of the magazine;

Fig. 17 is an edge view of a flaring tool cam, and of the indexing cam and associated mechanism;

Figs. 18 and 19 are face views of the flaring tool cam and the index cam, respectively;

Fig. 20 is a vertical sectional view of a portion of the magazine showing the tube loading ram rod and its related mechanism, in partial downward motion;

Fig. 21 is a vertical section of a portion of the magazine showing a ram or device for ejecting damaged tubes from the magazine;

Fig. 22 is a vertical section of the pick-off mechanism including a cam for actuating the means for removing a tube from a mandrel and passing it to a discharge chute;

Fig. 26 is a vertical section taken at the tube neck rolling station, on line 26—26 of Fig. 9;

Fig. 27 is a horizontal section on line 27—27 of Fig. 26, showing the rolls spinning the crimped end of a tube into reduced tubular form;

Fig. 28 is a view of a tube after it has been operated on at the rolling station;

Fig. 29 is a vertical section along line 29—29 of Fig. 26, showing the mechanism for rotating the rolls of the tube neck spinning device, partly in section;

Fig. 30 is a horizontal section taken on line 30—30 of Fig. 29, showing the means for mounting the rollers of the neck rolling mechanism;

Fig. 31 is a vertical section on line 31—31 of Fig. 30;

Fig. 32 is a vertical section on line 32—32 of Fig. 30, showing an arm having a cam roller for engagement with the operating cone of the neck rolling mechanism;

Fig. 33 is a horizontal section on line 33—33 of Fig. 32, showing a resilient mounting of one of the rollers of the neck rolling mechanism;

Fig. 34 is a vertical section of the tube necking and threading die mechanism taken at the die station (Fig. 9), illustrating the cam and linkage for operating the toggle of the necking pin;

Fig. 35 is a vertical section on line 35—35 of Fig. 34, of the toggle levers;

Fig. 36 is a horizontal section on line 36—36 of Fig. 34, showing the means for setting the necking pin in desired position;

Fig. 40 is a vertical section of a burring head for removing burrs from a tube neck and showing an air jet tube and chip remover or collector associated therewith;

Fig. 41 is a vertical section on line 41—41 of Fig. 40, showing the burring head removing burrs from a tube neck;

Fig. 42 is a horizontal section viewed upwardly along line 42—42 of Fig. 40, showing the mounting means for the burring knife;

Fig. 43 is a side elevation of the upper portion of a finished tube;

Fig. 44 is a layout of the cam shown in Figs. 2 and 34, which controls the operation of the thread forming dies;

Fig. 45 is a section on line 45—45 of Fig. 9, of the tube pick-off mechanism aligned with a tube on a mandrel of the main table ready to lift a tube therefrom;

Fig. 46 is an enlarged vertical section on line 46—46 of Fig. 45, showing the inflatable means of the tube pick-off mechanism inflated to grip a tube;

Fig. 47 is a vertical section on line 47—47 of Fig. 9, of the tube pick-off mechanism in its upper position and associated means for releasing a finished tube for delivery into a discharge tube; and Fig. 48 is an enlarged section, similar to Fig. 46, showing the tube pick-off inflatable means deflated to release a tube.

While the items to be operated on in this machine may, strictly speaking, be termed tube bodies, they will henceforth be referred to as tubes A for brevity.

General description of machine

Figure 1:
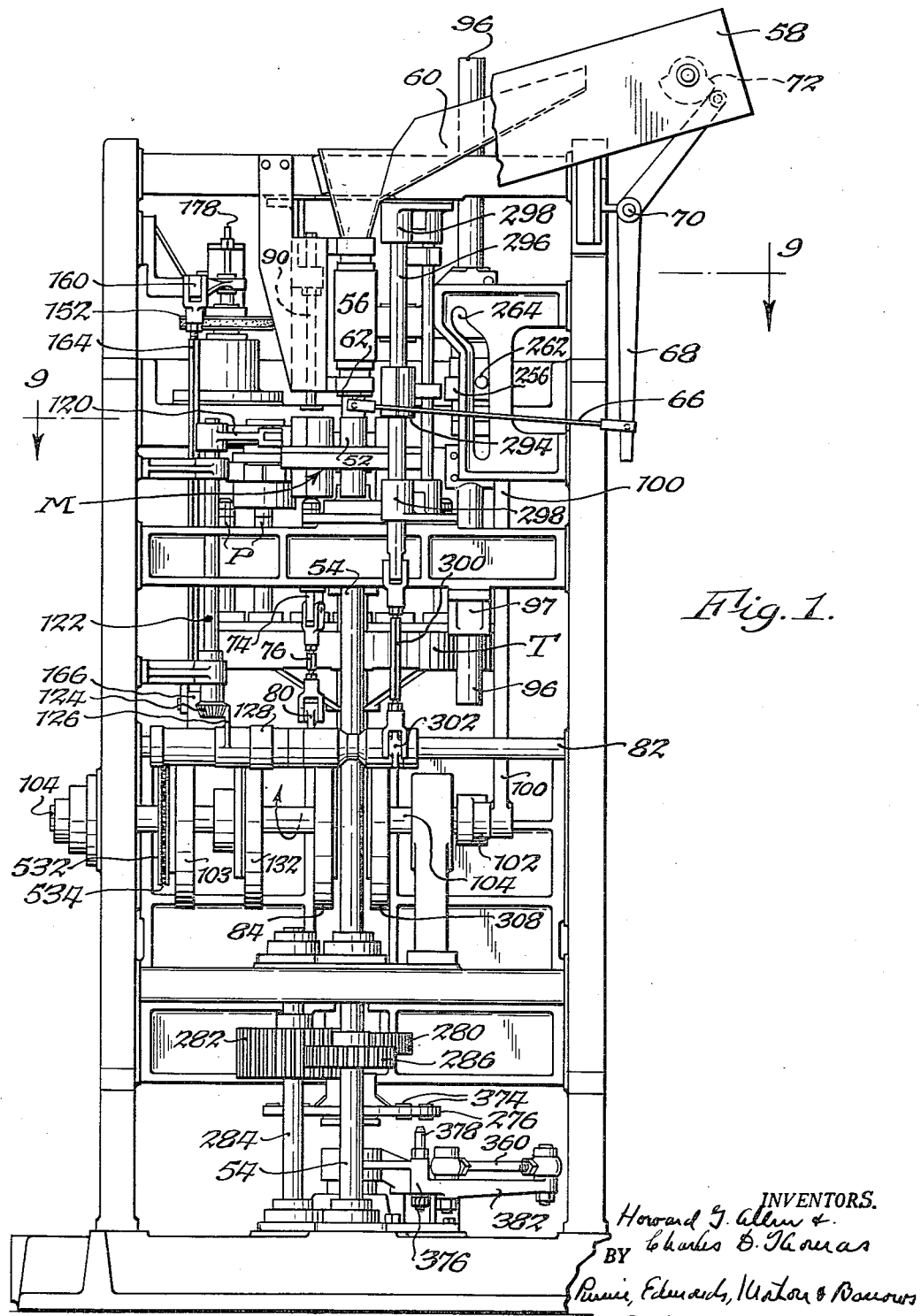
Fig. 1 is a front elevation of a machine for making collapsible tubes from tube body blanks, including a portion of a conveyor for delivering tube bodies to the machine.
Figure 9:
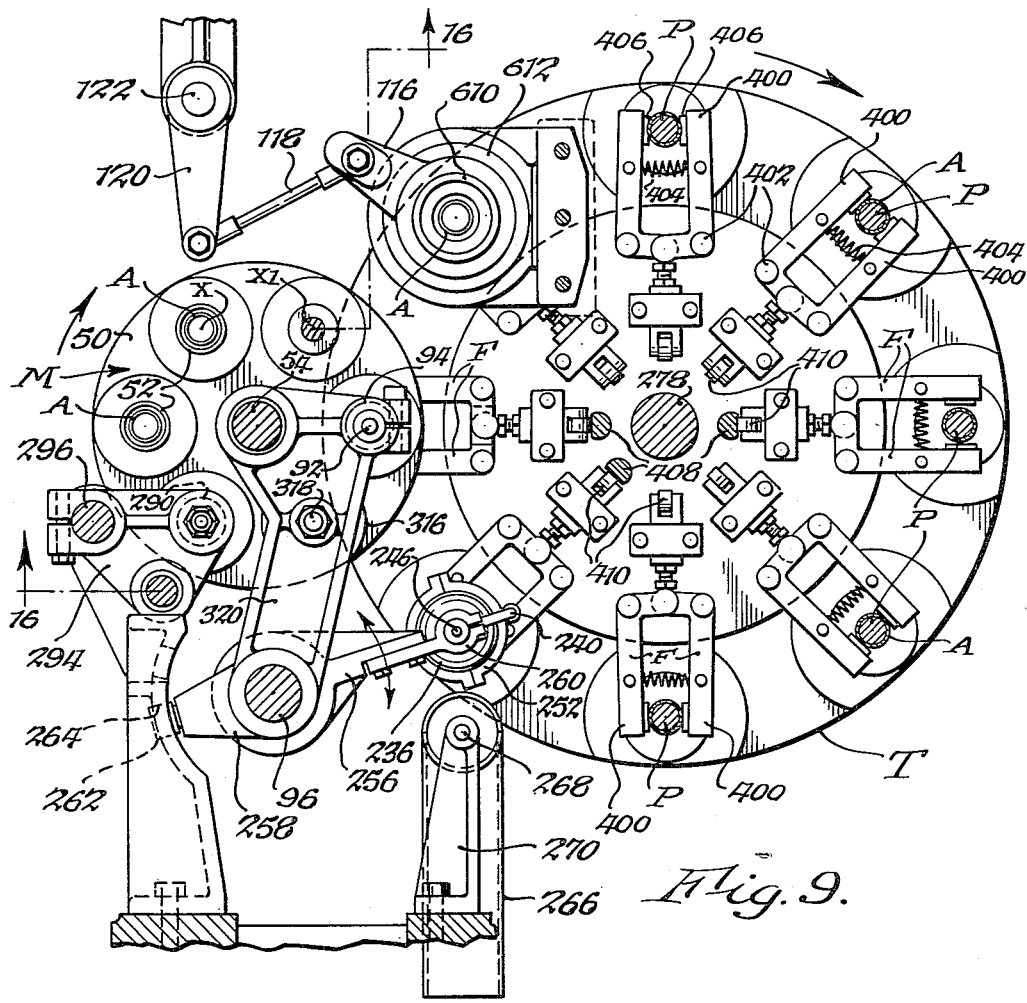
Fig. 9 is a horizontal section on line 9—9 of Fig. 1, showing the main table and the tube body feeding magazine.

As shown particularly in Figs. 1, 9 and 10, the machine includes a magazine M consisting of a horizontal cylindrical plate 50. Plate 50 supports a plurality of tube body supporting cylinders 52. There are six cylinders equally spaced around a drive shaft 54, see Fig. 9. The magazine M is intermittently rotated, by means to be described, so as to move step by step in increments of 60°. In delivering tubes A to one of the cylinders 52 of the magazine, they are dropped by gravity one after another into a hopper 56, the lower end of which is aligned with one of the cylinders 52 in each position of the magazine, as seen in Fig. 10.

Any suitable means may be used for delivering the tubes A. We have shown a conveyor trough 58 which may have therein an endless chain conveyor, not shown, provided with spaced flights for carrying the tubes to that end of the trough which is illustrated in Fig. 1. Suitable means, such as a timed air blast mechanism, may be employed to eject the tubes one after another from the trough 58 to an inclined chute 60, see Fig. 1, down which the tubes fall by gravity into the hopper 56. The lower open end of the hopper may be closed by a movable plate or shutter 62, pivoted between its ends at 64, see Fig. 10.

The end of shutter 62 remote from hopper 56 is pivotally connected to one of an end of a link 66, Fig. 1, the opposite end of which is connected to a bell crank lever 68 pivoted on the frame of the machine at 70. This lever 68 may be actuated by a cam 72 mounted on the upper end of the conveyor trough 58 so as to intermittently move the shutter 62 to one side of the hopper 56 at proper timed intervals to enable a tube in hopper 56 to fall into a cylinder 52 which has arrived therebeneath in accordance with the cyclic operation of the magazine M. A shelf 51 arranged beneath the magazine at the delivery point supports the tubular body until it is engaged by suitable holding fingers.

After a tube A has been so received in a cylinder 52, an index movement of the magazine carries the plate 50 by a clockwise movement to position the cylinder 52 at the next station (see X, Fig. 9), where at present, no operation is performed on the tube A.

A second index movement of the magazine M carries the tube body to the next station (see XI, Fig. 9). A sectional view taken radially through this station is illustrated in Fig. 16, where a flaring operation is performed on the lower end of the tube A for facilitating the movements of the tubes through subsequent operations.

The flaring mechanism comprises a vertically reciprocable flaring tool 74, the upper end of which is of conical formation, as shown. The tool 74 is pivoted to a connecting rod 76. The lower end of this rod is pivoted at 78 to a lug on an actuating lever 80. One end of lever 80 is pivoted on a horizontal rock shaft 82. The other end of lever 80 has a cam follower 83, which is engageable in a cam track of cam 84. Cam 84 is mounted for rotation on horizontal shaft 104.

The mechanism described is properly timed to shift the tool 74 up and down. In Fig. 16, the tool is shown in its upper position and in proceeding to that position, it engages the open bottom end of a tube A and raises it until the upper end of the tube engages a flare stop or rod 90 adjustably mounted to depend from a bracket secured to the machine frame. Flare stop 90 is positioned with respect to the length of a tube A such that when engaged by a tube, the lower end of the latter will project slightly out of the lower end of its supporting cylinder 52, so as to enable the tool 74 to enter into and flare the lower end of the tube, as seen in Fig. 16.

In Fig. 16, we have illustrated the position of a support 88 on which the tube rests after release of the holding fingers hereinafter described.

After recession of the tool 74 to its lower position, another index movement of plate 50 occurs, which carries the flared tube A to the next station which may be termed a loading station, since it is here that the tube bodies are caused to be moved from the magazine on to one of the mandrels of the main table T. This table T, as shown in Fig. 9, has eight mandrels P at equally spaced stations which are therefor disposed 45° apart with respect to the axis of table T. Table T is rotatably mounted with respect to a vertical shaft 278. Suitable index mechanism, to be described later, operates to shift the table T intermittently a distance of 45° with respect to shaft 278. Each of the eight stations on the table T is substantially alike and includes an upstanding post or mandrel P, the diameter of which enables tubes A to be deposited on and slidably engage, the same as indicated in the drawings.

The mechanism for removing the tubes A from the magazine at the loading station and placing them sequentially upon succeeding posts or mandrels P of the table T is shown in detail in Fig. 20 and will now be described. When the magazine cylinder 52 with a tube A therein comes to rest above and in axial alignment with a mandrel P, a tube loading device 92, in the form of a plunger, is moved down into the cylinder 52. Loading device 92 is mounted in gripping brackets 94 clamped upon a vertically reciprocable ram rod 96. Loading device 92 engages the upper end of the tube A and ejects it from the cylinder 52 and slides it downwardly over the aligned mandrel P.

Ram rod 96 slidably engages in suitable guides 97 (see Fig. 20) mounted on the frame of the machine and has connected thereto by a pivot 98 the upper end of a crank arm 100. The lower end of this crank arm is pivoted to a crank 102 carried on the horizontal shaft 104, suitably mounted in the machine frame. This shaft is arranged to rotate clockwise, as seen in Fig. 20, and the parts are so proportioned and related that the tube loading device 92 successively enters the cylinders 52 as each arrives at the loading station to push tubes therefrom on to mandrels, as described. It is desirable to retain the tubes A on the posts or mandrels P at desired or selected elevations throughout their passage from one station to another on table T. This is accomplished by pairs of fingers F (see Figs. 9 and 10), which engage opposite sides of a tube body. The operation of these fingers will be described in detail later.

A tube A having been deposited on a mandrel P at the loading station, the table T is indexed or given one step forward in the direction of the arrow (see Fig. 9). A mandrel with a tube thereon so shifted will arrive at a station where an upper portion or zone of the tube is crimped into the formation shown in Fig. 24. In order to effect clearance between the magazine and the table, the table is lowered prior to an index step and after that step has been completed is again raised. The table T has for this purpose associated therewith a ram pin 106 (see Fig. 7) rigidly attached to a ram 108 which is slidably mounted in guides 110. Pin 106 enters a seat 112 in the table so that the latter can drop with the ram while being prevented from rotation until reaching its lower position. The movement of the ram is such that the pin 106 moves downwardly out of the seat 112 after which the table can be indexed to the next position. The ram and pin then rise again to engage the pin into the next seat 112 which has been moved to locking position. There are, of course, eight of the seats 112 spaced in accordance with the eight stations on the table. A detailed description of the mechanism shown in Fig. 7 for actuating the ram 108 will be given later.

Figure 23:
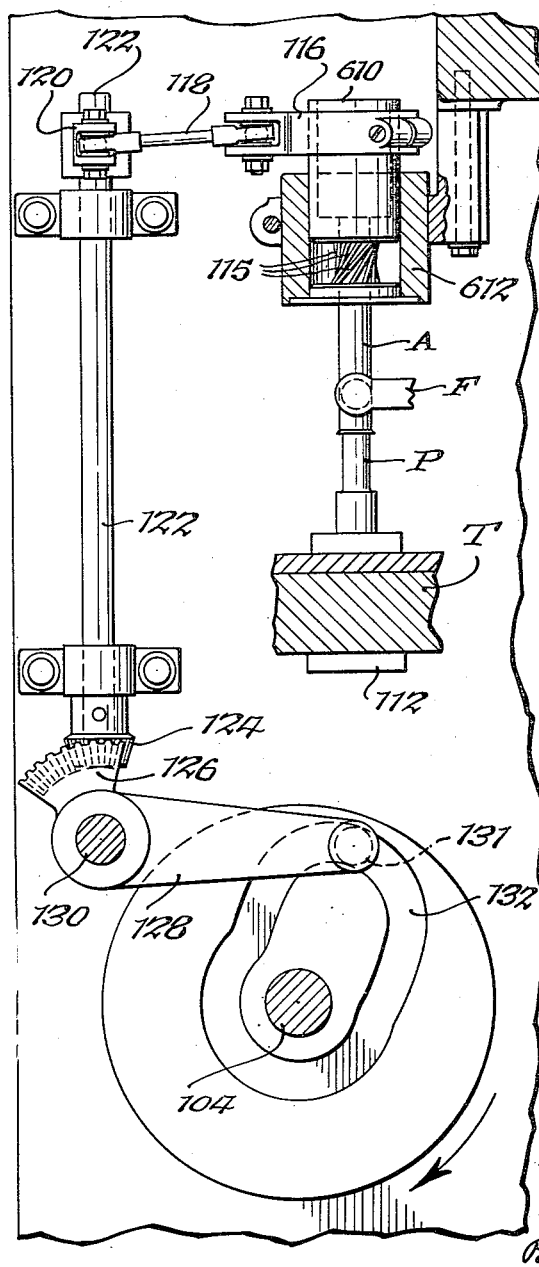
Fig. 23 is a vertical section through the crimping station of the main table.

After the foregoing table index movement has occurred and a tube has been positioned at the crimping station, it will be operated upon to produce the crimped formation (see Fig. 24) by the mechanism shown in Fig. 23. The crimps are formed in the tube by the mechanism shown in the Falconer application, Serial No. 733,307, filed March 8, 1947, now Patent No. 2,569,850, issued October 2, 1951. The crimping mechanism comprises a pair of cylindrical members 610 and 612, one of which fits into the other as shown. The member 610 is rotatable with respect to the member 612. As shown (see Fig. 23) with the table in its upper position, the member 610 is caused to rotate about the axis of a tube by means of a saddle 116 (see Figs. 9 and 23). This saddle is pivotally connected to an arm 118 mounted on the end of a crank 120. Crank 120 is attached to the upper end of a vertical shaft 122 mounted in bearings on the machine. The lower end of shaft 122 has secured thereto a bevel gear 124. This gear meshes with a gear segment 126 forming one arm of a bell crank lever 128.

Lever 128 is pivoted on a horizontal shaft 130. The bell crank 128 carries a follower 131 engaging in a cam 132 carried on the shaft 104 before mentioned. A plurality of rods 115 are arranged between the members 610 and 612. These rods are of equal length and are spaced equidistantly and concentrically around the axis. The rods are provided with balls (not shown) on their upper and lower ends, these balls being mounted in seats in the members 610 and 612. The rods are thus permitted to assume various angles with respect to the members 610 and 612 and with respect to the axis when the members 610 and 612 are rotated relatively to each other.

Figure 24:
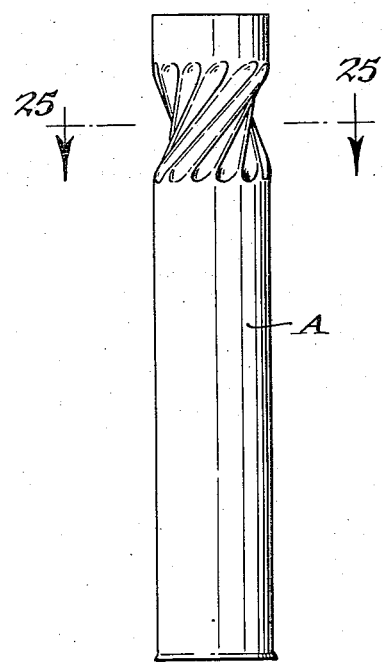
Fig. 24 is a view of a tube which has been worked upon by the crimping mechanism.
Figure 25:
Fig. 25 is a horizontal section through the crimped portion of a tube taken on line 25—25 of Fig. 24.

As the upper head 610 is rotated, the crimper rods 115 connected thereto move downwardly and inwardly toward and about the tube A so as to compress portions thereof and form the desired corrugations in the tube, as seen in Figs. 24 and 25.

A reverse motion of the member 610 opens the crimper rods and frees the tube. The crimping operation having been accomplished, the table is lowered, moved forwardly to the next station by the index mechanism and raised to operative position at that station. At this station approximately the upper half of the corrugated portion of the tube, seen in Fig. 24, together with the cylindrical end portion of the tube thereabove, are spun or compressed into a reduced cylindrical mass approximately as shown in Fig. 28 for providing a portion which subsequently is formed into the tube neck and receives the threads for attachment thereto of a threaded cap. The spinning or rolling mechanism is illustrated in Fig. 26. A pair of spinning rollers 134 (see Figs. 26 and 27) are rotatably mounted on studs 136. The rolls are arranged to be operatively positioned at diametrically opposite sides of the axis of a tube A.

Details of the mounting and operation of the spinning rollers 134 are illustrated in Figs. 29 to 33. Each stud 136 is mounted on an arm 138, pivoted between its ends on a journal 140 (see Fig. 30). Each journal 140 is supported on a member 142 (see Fig. 29). The rollers are urged toward the axis of the tube to create the desired rolling pressure by centrifugal force. Springs 144 urge the rollers in the opposite direction, or outwardly away from the tube. These springs bear against the abutments 146 (see Fig. 33) and are tensionally secured by screws 148. The journals 140 are mounted to revolve about the axis of the tube on the mandrel and about the axis of a shaft 150 which is aligned with the axis of the tube to be operated upon. This mechanism is best illustrated in Fig. 29. The shaft 150 is driven by a pulley 152 which is splined to the shaft to permit that shaft to move up and down relatively to the support in which these parts are mounted. A conical cam 154 is mounted on the lower end of shaft 150. Cam 154 is operatively engageable with rollers 156, one of which is mounted on each of the arms 138. By downward movement of the cam 154, the rollers 156 are moved away from each other, thereby causing the rollers 134 to move inwardly. As rollers 134 are moved inwardly and rotated about the axis of the tube, they compress between them the aforementioned upper portion of the tube to press it into the configuration shown in Fig. 28.

In Fig. 26 is illustrated the mechanism for raising and lowering cam 154. This mechanism includes a saddle 158 connected to the upper end of shaft 150. The saddle is pivotally connected to a bell crank 160 pivoted at 162 and having its outer end pivoted to the connecting rod 164. This rod in turn is pivoted at its lower end to a crank 166. Crank 166 is supported on a shaft 168 and carries a follower 170 which engages in a cam track 172 of a cam 103 supported on a drive shaft 104. This cam 103 may be referred to as a spinning cam and, is seen at the center left portion of Fig. 1. It is attached to shaft 104.

During the foregoing operations, a spin rod 176 rigidly fixed with respect to the frame enters the portion of the tube which is to be compressed by virtue of the upward motion of the table. This rod affords an abutment for and determines the inner diameter of the neck. This pin is mounted on a vertical rod 178 which passes downwardly through the aforegoing rotating shaft 150 so as to protrude beyond the bottom of the cam 154, see Fig. 29. Following the spinning action to reduce the upper portion of the tube to approximate neck size, the table T is given another index motion which carries the tube to another station in which, however, no operation is performed.

Figure 37:
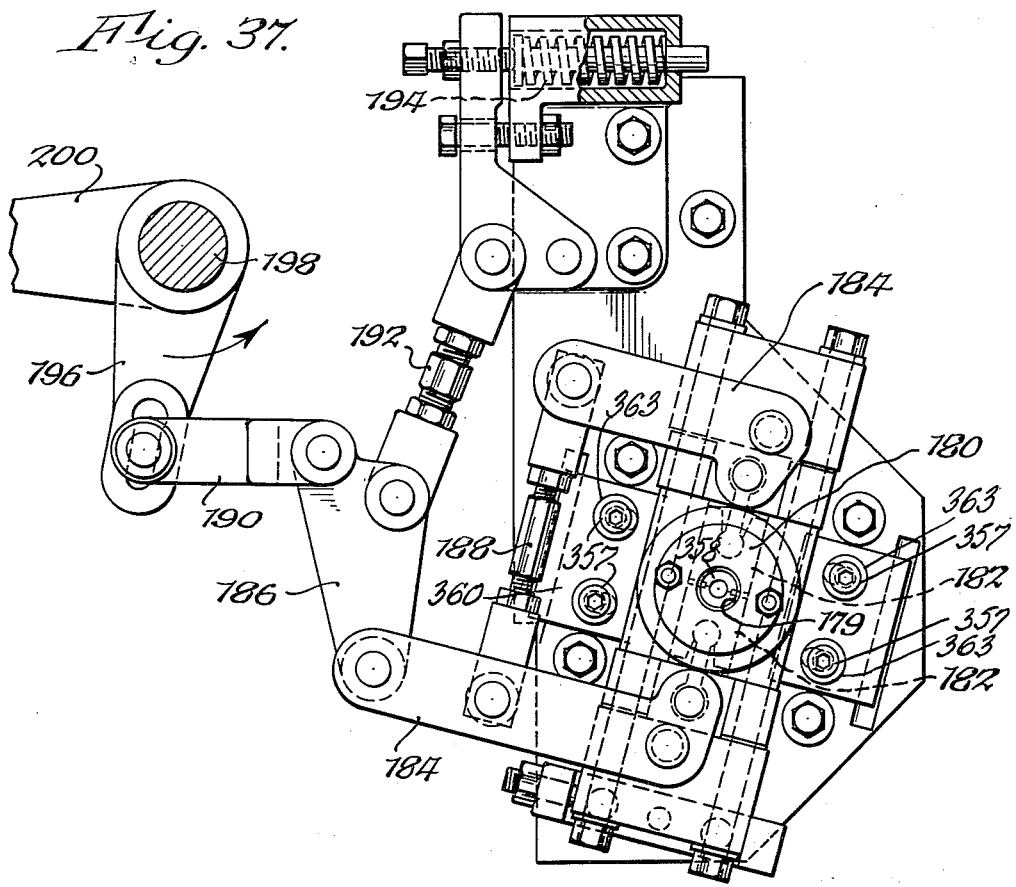
Fig. 37 is a bottom plan view of the threading die set taken on line 37—37 of Fig. 34, the dies being in closed position.
Figure 38:
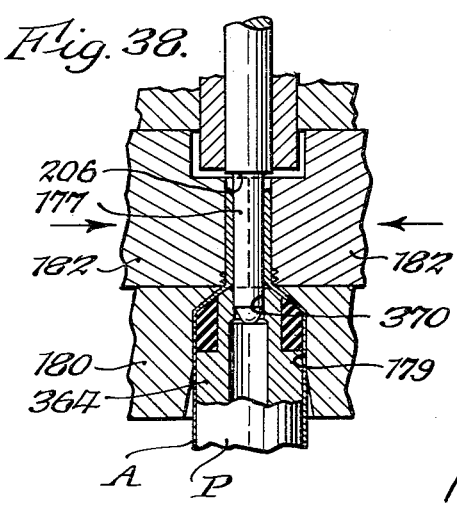
Fig. 38 is a vertical section through the set of threading dies, showing a tube in the dies, the necking pin entering the neck of a tube, and the threading dies in closed position.
Figure 39:
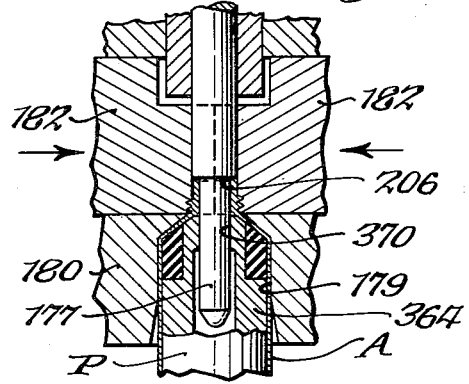
Fig. 39 is a view similar to Fig. 38, showing the necking pin pressing the metal of a tube neck into the thread forming portions of the threading die.

Another indexing step carries the tube A to what might be termed a head forming station, illustrated in Fig. 38. At this heading station, the neck, formed as just described, is compressed lengthwise and downwardly for the purpose of providing sufficient metal from which the threads may be formed around the neck. Fig. 38 shows the neck prior to this operation and Fig. 39 shows the same shortened into compressed form with threads formed thereon as a result of an operation on it by the threading mechanism illustrated particularly in Fig. 37, which is a view looking upwardly to better illustrate its construction.

When arriving at the head forming station the tube, as shown in Fig. 38, and which is carried on one of the mandrels P, is moved upwardly by an upward movement of the table T so as to enter a cavity 179 in a pressure plate 180. The upper end of this cavity has a configuration such as to produce the sloping conical shoulder of the finished tube as a result of the upward pressure exerted against the tube by the mandrel thereby compressing the corrugations formed in the lower portion of the crimped area of a tube. Mounted directly above and engaging the pressure plate 180 are a pair of radially opposed split dies 182. The inner end portions of these dies each have a half circular recess in which mating portions of the die thread are formed. The dies are in closed position at the time the tube enters the die. The dies 182 are moved towards each other into closed position by link arms 184 pivoted thereto in the manner shown in Fig. 37. A crank 186 is pivoted to the other end of one of the links. The link arms 184 are operatively connected by rod 188. Crank 186 is pivoted to an operating link 190 and to a toggle link 192 adjustably spring mounted at 194 (see Fig. 37).

Link 190 is connected to a crank arm 196 mounted on a vertical shaft 198. This shaft is provided with crank 200, the free end of which has a follower 202 operating in a barrel-shaped die cam 204 mounted on shaft 174 (see Fig. 2). The operation of cam 204 is such as to provide a complete cycle of operations of the die mechanism of Fig. 37 each time a mandrel P presents a tube at the die station as a result of the step by step operation of the table T. After the dies 180 have been moved to closed position a tube is moved into the die, and a necking pin 177 is moved downwardly within the neck from the position of Fig. 38 to that of Fig. 39. A shoulder 206 at the upper end of the necking pin engages the top end of the neck and as it descends, forces the metal of the neck downwardly into the thread configurations of the die members 182, thereby reducing the neck to the finished length desired and at the same time forcing the excess metal into the thread configurations. The upper end of a tube now has approximately the appearance shown in Fig. 43. Following the foregoing, the die members 182 are moved away from each other, the necking pin 177 is withdrawn by the necking pin operating mechanism, shown in Fig. 34, and the table is lowered carrying with it the tube A on mandrel P to withdraw the tube as thus far completed from the head forming station.

In its present condition, there is some excess metal or flash protruding in a generally upward direction from the annular upper edge of the tube neck. It is desirable to provide a finishing operation for removing this burr or excess flash metal preferably by slightly bevelling this portion as seen at the upper end of the neck in Fig. 43. To effect the removal of the burr from the top of the tube neck, a tube on a mandrel P is indexed to the next station which is that illustrated in Fig. 40. Here, upward movement of the table T will bring the upper edge of the tube neck into alignment with a burring knife or tool 210. This knife is carried by an annular sleeve 212 which surrounds a plug 214 secured to the lower end of a rotary shaft 216. The shaft 216 is mounted upon the frame of the machine and is adjustable by means of mechanism 218 for operatively positioning the mechanism. Shaft 216 has secured to its upper end a pulley 220 for rotating it as by a belt shown deriving its power from any suitable source. The knife carrying sleeve, before mentioned, is capable of limited up and down movement relatively to the plug 214 as by a slot 222 in the sleeve with which a key 224 secured to the plug engages.

Thus in the upward movement of a tube on a mandrel, a stud 226 at the lower end of the sleeve 212 enters the neck of the tube and a shoulder on that stud having a relief portion 228 enables the cutting end of the knife 210, raised by virtue of the sliding action of sleeve 212, to engage with and bevel off the top of the tube during rotation of the knife mechanism just described. It is desirable to remove chips of metal thus formed which may be effected by enclosing the lower portion of the burring mechanism, including the knife, in a shroud 230 (see Fig. 40). The shroud has a radial passage 231 extending to which a flexible collecting bag 232 may be attached. The chips may be induced to enter this bag by the action of a continuous blast of air entering the shroud by the way of a pipe 234.

In the present arrangement of the machine, the sixth index occurs which moves tubes and mandrels successively into an idle station where no work is performed. A seventh index or step movement of the main table T follows to bring the tubes A on the mandrels P into a discharge station where the finished tubes may be removed from the machine.

Mechanism for removing the tubes is illustrated in Figs. 21, 22 and 45 to 48. It should be noted that during the passage of tubes A on the mandrels P throughout the foregoing movements from the crimping mechanism to the idle station at the sixth index step, the pairs of fingers F, earlier referred to, have maintained gripping action on the tubes for holding them in desired position on the mandrels. The upward movement of the table T following the arrival of the mandrel at the discharge station, causes the upper portion of a tube to be gripped by a part of the discharge mechanism, as illustrated in Fig. 46, while at the same time the pair of fingers F which have been engaging the tube are released (see Fig. 9). The tube discharge mechanism includes a flexible sleeve 236, the upper and lower ends of which are secured to a tubular cylinder 238. As seen in Fig. 48, the space between the sleeve 236 and the cylinder 238 is in communication with a tube or passage 240 through which compressed air may be delivered. When this occurs, the sleeve 236 is inflated and forced into engagement with the tube A. Aligned with the axis of the tube A and the mandrel P at the foregoing station is an air control valve 242 having a passage 244 connecting with the pipe 240, before mentioned. Passing through the valve is a stem 246 having a reduced annular portion 248. Upward movement of the table causes the tube A on the mandrel to engage the lower end of the valve stem, as shown in Fig. 46, to raise it to a position wherein the annulus 248 connects pipe 240 with a source of compressed air 250 to thereby expand the sleeve 236.

As seen in Fig. 45, the cylinder 238 is secured by means of a clamp 252 to an arm 256 which in turn encircles a bracket 258 mounted on the ram rod shaft 96, before described. The arm 256 also carries a clamp 260 for supporting the valve 242 of the pick-off mechanism. It will be recalled that ram rod shaft 96 is movable up and down in suitable guides on the machine by its pivotal connection to the rod 100 which is operatively secured to crank arm 102 fastened to the horizontal shaft 104.

After the parts of the tube and discharge mechanism arrive at the position shown in Fig. 46, the crank 102 (see Fig. 20) is in the horizontally opposite position to that shown in that figure, so that continued rotation of shaft 104 will move shaft 96 upwardly carrying with it the valve mechanism including the still inflated sleeve 236. Simultaneously table T moves downwardly, which has the effect of removing the mandrel P from the tube A which is still being grasped by the inflated sleeve 236. The foregoing relative movements position the tube A beyond the top of the mandrel P. The bracket 258 carries a cam followerd 262 engaging in a cam slot 264 (see Fig. 22) which by its contour causes the bracket 258 to oscillate about shaft 96 carrying with it the arm 256 and the tube discharge mechanism including the valve 242. In this manner the tube A still supported in the mechanism is oscillated to one side of the mandrel P into a position directly over a discharge tube or chute 266, see Figs. 22 and 47. After the parts have thus moved laterally the continued upward movement of shaft 96 to the end of its stroke carries the cam follower 262 to the upper end of the cam slot 264, thereby bringing the valve rod 246 directly underneath a valve stop 268 which is mounted on a stationary bracket 270. Thus, as the upstroke is completed, the valve stem 246 is restrained from this last final up movement which causes its annulus 248 to move into communication with a relief passage 272 in the valve body. The air tube 240 is in communication with this passage so that the air which was entrapped between flexible sleeve 236 and the cylinder 238 is vented to the atmosphere. This causes the sleeve 236 to retract into engagement with the wall of the cylinder 238 thereby releasing the tube A which thereupon falls into the discharge tube or chute 266 and is removed from the machine (see Fig. 47).

*Detailed description of feeding magazine*

When a tube A drops by gravity into the first cylinder 52 of the magazine M, it comes to rest on the gate or shutter 62, as explained. The gate 62 is so timed by the cam 72 (see Fig. 1) and the connecting linkages that when one cylinder of the magazine is in axial alignment with chute 56, the gate is tripped open and the tube falls into that cylinder.

At this point in the cycle a holding finger 272 (see Figs. 13 to 15), normally holding the tubes in the magazine cylinders (as seen in Fig. 15) is cammed upwards so as not to engage within and interfere with the deposit of a tube in the cylinder as explained. This camming action is effected by cam 274 (see Figs. 12 and 14). An index of the magazine M is now effected carrying the tube in the cylinder mentioned to the first station.

Figure 5:
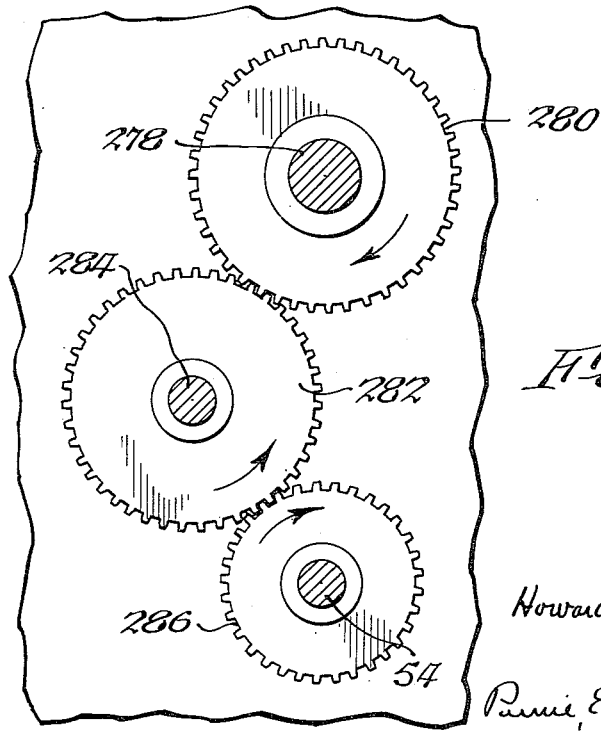
Fig. 5 is a horizontal section on line 5—5 of Fig. 4 showing driving gearing between the main table rotating shaft, an intermediate shaft and the shaft for rotating the tube body feeding magazine.

Indexing of the magazine feeder M is effected by rotation of index plate 276 (see Figs. 3 and 6) and shaft 278. This shaft carries gear 280 (see Fig. 5) which meshes with an intermediate gear 282 on shaft 284. Gear 282 in turn meshes with the magazine indexing gear 286 mounted on the magazine shaft 54.

This operation is in the nature of a preliminary indexing which, however, due to backlash of the gears, does not insure correct alignment of the magazine M in its step by step movements. In consequence a final accurate indexing mechanism is provided. Such mechanism is illustrated in Fig. 16. There is provided a spring loaded cone 290 backed up by spring 292 which is carried by an arm 294 rigidly secured to a vertical shaft 296. Shaft 296 has a limited upward and downward movement in bearings 298. Attached to the lower end of shaft 296 is a connecting arm 300, the lower end of which is pivoted to a bell crank lever 302 mounted between its ends on the shaft 82 previously mentioned. The other end of lever 302 carries a follower 304 operatively engaging in a cam track 306 of the index cam 308 (see Fig. 19).

In Fig. 16 of the drawings the lever 302 is shown broken away to illustrate the lever 80 which is in transverse alignment with it. The relative positions of the levers and the connections to connecting rod 76 and connecting arm 300 are shown in Fig. 17.

The action of this mechanism is such that as a magazine M is driven through an index step to approximate position by the gearing described, cone 290 moves downward and engages the upper open end of one of the cylinders 52 of the magazine, as seen in Fig. 16. This operation compensates for any deviation either advanced or retarded between the magazine and the stations into which it is desired to be moved.

After a tube has been received in a cylinder of the magazine, and the magazine has rotated, such rotation shifts the magazine so that the movably mounted tube holding finger 272 is moved away from the cam 274 (see Figs. 12 and 14). This permits the finger to fall against the tube and lightly secure it in its intended position in the magazine cylinder. As shown, the finger 272 is mounted in a holder at the lower end of which is the ball detent 310, which as long as it rides on cam 274 holds finger 272 out of engagement with a tube.

The first of the six indexes described brings the tube to the flare station, the second index carries it to an idle station, the third index positions it over a mandrel P of the main table T. Referring to Fig. 14, when the tube reaches that station, holding finger 272 is cammed upwardly out of engagement with the tube by a screw 312 mounted on the collar 88 which permits the loading ram 92 to push the tube downwardly out of the magazine cylinder and upon the mandrel. The next index of the magazine M aligns the cylinder 52 which should have just been emptied over a slug chute or aperture 316 on the magazine (see Fig. 9). An ejector rod or plunger 318 reciprocates into and out of a cylinder 52 at this station.

Thus, if for any reason the tube was not successfully rammed over a mandrel in the manner just described, it in all probability will be crumpled and be retained in the cylinder. Thus by providing the ram 318 operable into the cylinder directly after passing the loading station, any slugs will be removed and discharged before the cylinder reaches a starting position where another tube is to be positioned in it. The slug ram 318 is mounted on a bracket 320 (see Fig. 9).

*Description of the necking pin operating means*

The operation of the neck forming dies 182 has been described.

The mechanism which operates the necking pin 177 is illustrated in Fig. 34. The necking pin 177 is attached loosely to a piston 322 by means of a plate 324. This mounting is such as to permit a limited floating movement of the pin. The pin 177 is guided in its up and down movements by the bushing 326. The piston 322 operates in a cylinder 328 and is reciprocable vertically therein by its connection to the lower ends of toggle links 330.

Toggle links 330 are pivotally connected, as shown, to yoke 332, the outer end of which has a threaded adjustment 334 by which it is pivoted at 335 to one arm 336 of a bell crank fixed to shaft 338. The other arm 340 of the bell crank is pivoted to a connecting rod 342 which in turn pivots on the end of a lever 344 pivoted at 346. The other end of the lever 344 carries a follower 348 operable in a cam track 350 of the necking cam 352 mounted on shaft 174.

The adjusting screw 334, above mentioned, controls the initial position of the necking pin, since by suitable adjustment piston 332 can be fixed relatively to its cylinder.

A set of relief springs 356 (see Fig. 34) prevents overloading of the machine should excess material accumulate in the threading dies on the downward stroke of the necking pin. These springs are carried by studs 357 which are anchored in casting 362 which carries the necking pin assembly. The studs pass through openings in plates 360 and 361. The springs are arranged between upper plates 360 and the heads 363 of the studs. The tensioning of the springs is controlled by adjusting plate 360 toward or away from plate 361. This is accomplished by adjusting screws 358, of which there are four (see Fig. 37). These screws pass through threaded openings in plate 360 and engage plate 361. The entire necking pin assembly is carried by casting 362.

Description of the mandrels or Posts P of the main table T

A sectional view of the upper end of a mandrel P is shown in Fig. 11. Recessed into the upper end of the main body of the post is a hardened steel bushing 364 having a reduced shoulder 366 which is retained in a seat in the post by the screw 368. The bushing 364 has a central machined bore 370 which is diametered to provide a guide for the necking pin 177. The relative action of these parts is illustrated in Figs. 38 and 39.

The upper end of the bushing 364 is reduced to provide an annulus about which fits a rubber sleeve 372, the outer diameter of which is the same as that of the bushing and the post. As shown, the rubber sleeve is bevelled to form a conical annular shoulder and, in operation, forms a compression member to shape the conical shoulder on the tube when the lower corrugated portions of the crimp on the tube are confined between it and the aperture 179 (see Figs. 38 and 39). Provision of the rubber sleeve also provides means for accommodating reasonable variations in thinness of the conical shouldered portions of the tube.

Indexing means for the main table

Referring to Fig. 6, shaft 278 is rigidly secured to the main table T. The mounting of the upper end of shaft 278 is shown in Fig. 10. The rotary motion of table T is accomplished by means of index plate 276 (see Fig. 6) which has eight apertures 374 equally spaced about shaft 278. A crank arm 376 is pivoted on shaft 278 and carries an index pin 378 engageable in one after another of the holes 374. The free end of crank arm 376 is connected by a link 380 to one arm 382 of a bell crank. The bell crank is pivoted at 384 and the other arm 385 has a follower 386 which operates in a groove 388 of an index cam 390 carried by the shaft 174, previously described.

Figure 4:
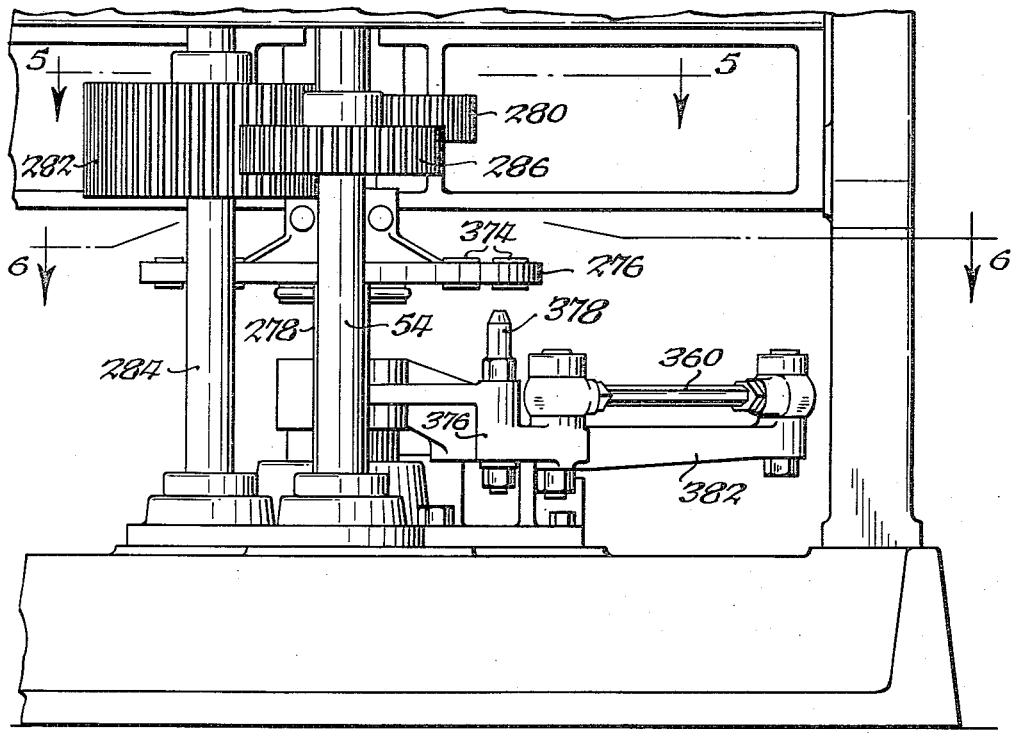
Fig. 4 is an enlarged elevation of the lower portion of the machine as seen in Fig. 1, showing the indexing mechanism for effecting step by step movements of the main table.

The operation of the crank 382 through cam 390 effects an index of plate 276 and therefore of the table T 45° for each complete cycle. This movement brings a seat 112 of the table directly over the ram 106 (see Fig. 7). Upward motion of the ram causes its engagement in the seat to lock the table in proper position, as has been described. Each time the table moves upwardly, the index plate 276 (see Fig. 6) is released from the index pin 378. This is well shown in Fig. 4. During this relative position of the parts, the indexing mechanism shifts the index pin 378 backwards 45° so that upon subsequent downward movement of the table the next seat 374 in plate 276 will engage over the index pin, thus readying the parts for another index step.

Operation of main table tube holding fingers

Referring to Figs. 9 and 10, each mandrel P has so operating therewith a pair of the gripper fingers F. Each pair of fingers comprises pivoted arms 400 supported on pivots 402 and having between them a tension spring 404 urging them towards each other. Each arm carries a rubber disc 406 engageable with the tube on a mandrel, as shown. The spring fingers close on a tube immediately after a tube is loaded on to a mandrel at the loading station and remain in that position until the tube reaches the unloading or pick-off station. At this point a fixed cam rod 408 (see Fig. 10), carried on a mounting surrounding the shaft 278, engages with a roller 410 on a piston 412. The piston is thus moved radially outwards to engage the short sections of the fingers to swing the fingers about their pivots against the action of spring 404 and thereby move the pads 406 out of contact with the tube. This action occurs on the upstroke of the table. A similar finger opening action is repeated on the upstroke of the table at the next station where a new tube body A is to be engaged over a mandrel at that station. Suitable adjusting screws are provided, as shown in Fig. 10, for positioning the cam 408 and the pistons 412.

Operation of table lifting ram

The means for raising and lowering the ram 108 (see Fig. 7) includes toggles 428 and 430, the free ends of which are respectively pivoted to the ram and to a bracket 431. The pivoted connection between the toggles 428 and 430 is operatively connected to links 432 and 434 which together support a cam follower 436. This follower operates in a cam track 437 of a cam 438 secured to the shaft 174, before mentioned. Relative motion between the parts is illustrated in Fig. 7 and, while the table T is in its upper position, index plate 276 is disconnected from its actuating pin 378 as in Figs. 1 and 4. The connection between pin 378 and plate 276 is restored when the index plate is lowered as a result of the travel caused by disconnection of ram 106 (see Fig. 7) from the table.

Description of machine drive

Figure 2:
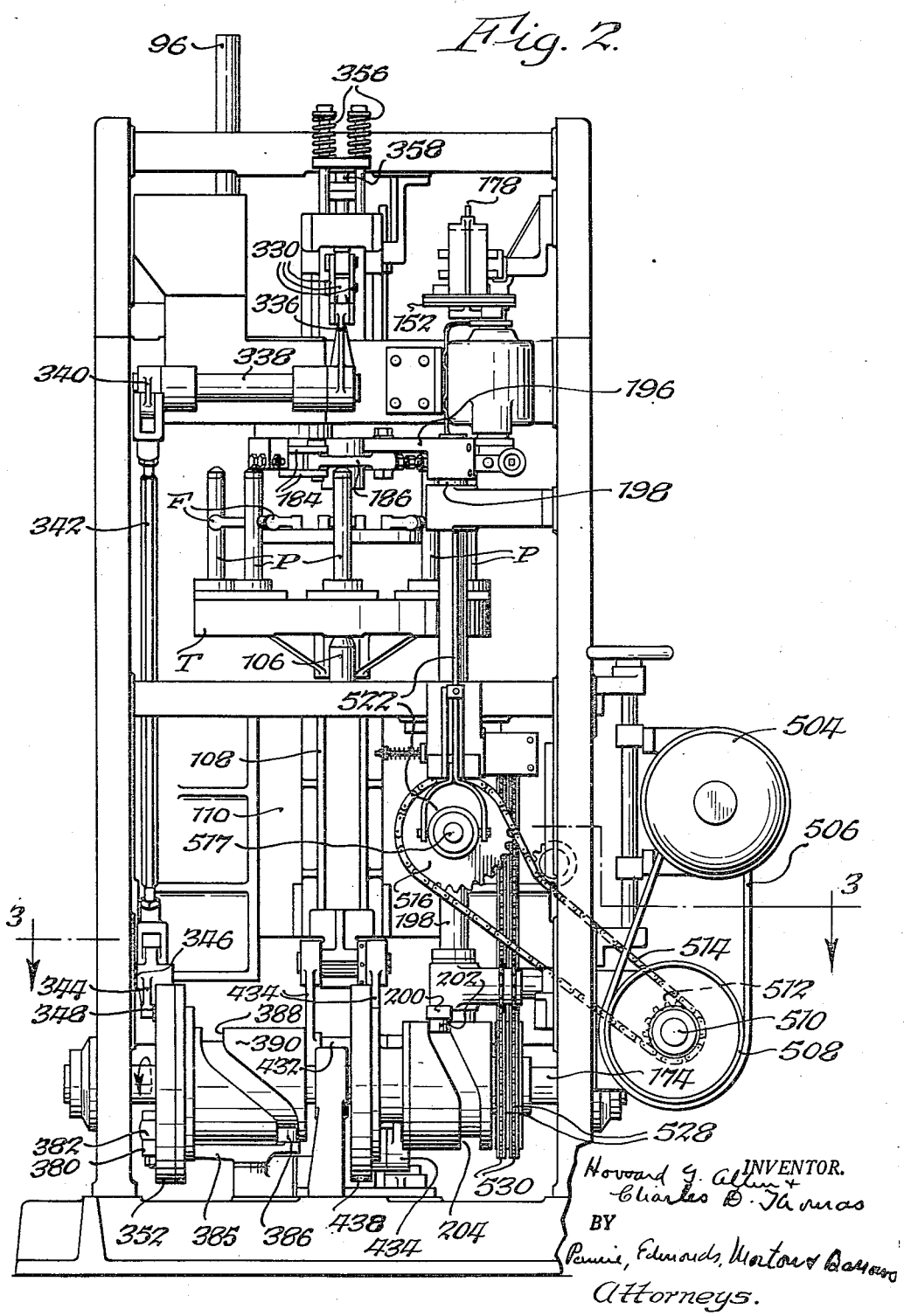
Fig. 2 is an elevation of the machine as seen from the rear of Fig. 1 wherein means for supplying power to the machine for driving it is disclosed.
Figure 3:
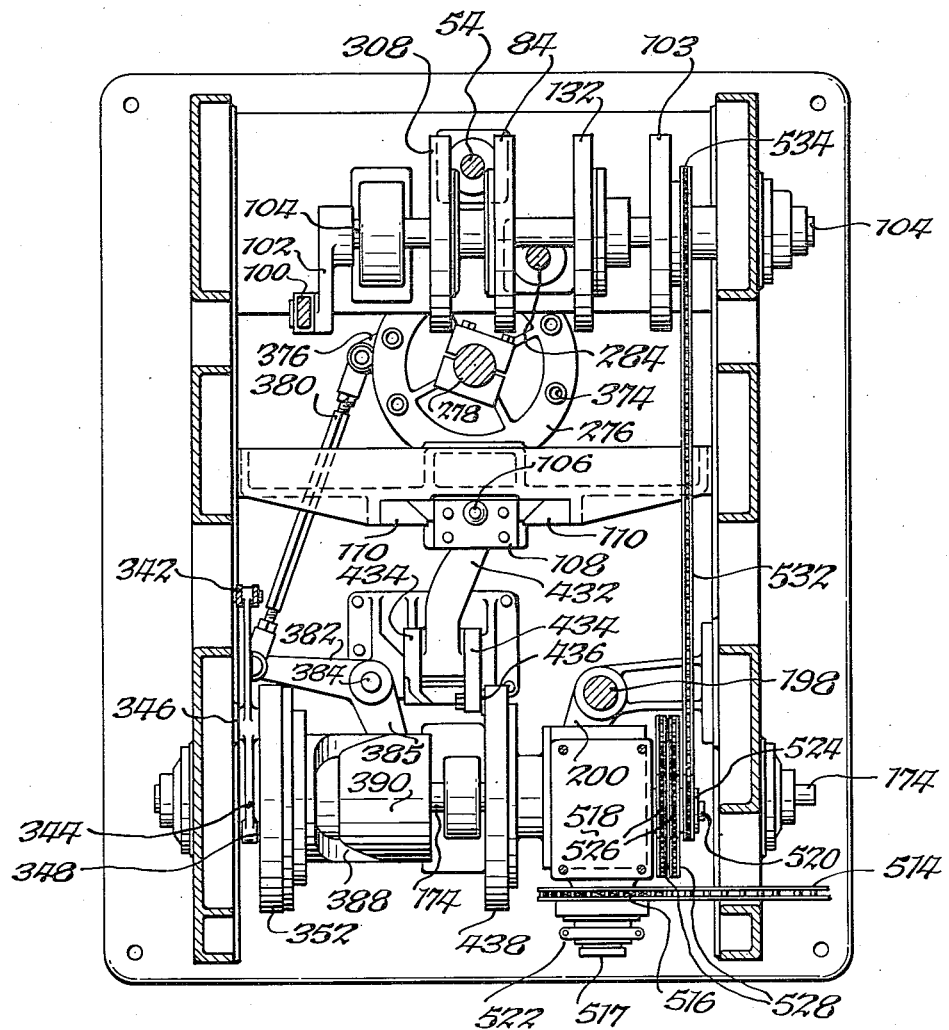
Fig. 3 is a horizontal section on line 3—3 of Fig. 2, illustrating further driving connections for the principal drive shafts in the machine.

The mechanism for driving the machine is illustrated in Figs. 1 to 5. Power is derived from a motor 504 (see Fig. 2) by which energy is transmitted to a shaft 510 by means of a belt 506 and a pulley 508. As incorporated in the machine, a variable speed arrangement is provided by the foregoing. Secured on shaft 510 is a sprocket 512 which, through sprocket chain 514, drives sprocket 516 on shaft 517. Sprocket 516 transmits power through a gear box 518 (see Fig. 3) to a shaft 520 which has attached to it sprockets 524 and 526. A hand operated clutch 522 is associated with shaft 517, as seen in Figs. 2 and 3, whereby power may be applied to or cut off from the machine at will. By means of chains 528, power is transmitted from sprocket 526 to sprockets 530 (see Fig. 2) and by means of a chain 532 (see Fig. 3) power is transmitted from sprocket 524 to sprocket 534.

Referring now to Fig. 2, sprockets 530 are rigidly secured to the cam shaft 174 which has been described. This shaft carries the die cam 204, the table raising and lowering cam 438, the cam 390 which provides rotary motion to the table, and the cam 352 for operating the tube necking mechanism. Referring to Fig. 3, sprocket 534 is attached to cam shaft 104 which carries with it cam 103 for the spinning operation, the cam 132 for the tube crimping device, cam 308 for operating the flaring tool, the cam 84 for effecting precise indexing of the magazine and the crank 102 which operates the tube lifting mechanism for discharging tubes from the machine.

We claim:

1. In a machine for forming collapsible tubes from tubular bodies, a turntable, a plurality of tube supporting members carried by the turntable, means for imparting a step by step movement to the turntable, means for raising and lowering the turntable, said means comprising a plurality of seats equal in number to the number of tube supporting members formed in the bottom of the turntable, a vertically movable pin which is in one of said seats when raised, a ram connected to the pin, and means for moving the ram and pin a greater distance than the distance the table is lowered for releasing the pin from one of the seats for indexing when the ram and pin are lowered.

2. In a machine for forming collapsible tubes from tubular bodies, a magazine, a plurality of cylinders carried by the magazine to receive the tubular bodies, said cylinder being open at both ends, means for imparting a step by step movement to the magazine to bring each of the cylinders successively to a plurality of stations, holding fingers mounted on the magazine to engage a tube in a cylinder and retain it therein, means at one station to release the holding fingers, a ram to force the tube out of the cylinder when the fingers are released, and an ejector rod arranged at the next station to eject tubes from cylinders not released by said ram.

3. In a machine for forming collapsible tubes from tubular bodies, a magazine consisting of a disc, a plurality of tube supporting members carried by the magazine near its periphery and arranged parallel to the axis, the tube supporting members comprising hollow cylinders open at both ends, means for imparting a step by step movement to the magazine to bring the tube supporting members successively to a series of stations, holding fingers engaging the tubes in the supporting members of the magazine to retain the tubes therein, a turntable arranged beneath and eccentric to the magazine, a plurality of mandrels on the turntable to support the tubular bodies, means for imparting a step by step movement to the turntable to successively bring each of the mandrels to a series of stations, one station of the magazine being axially aligned with one station of the turntable, means for releasing the holding fingers at said station, and a loading device to transfer the tubular bodies at said station from the magazine to the turntable, said loading device comprising a plunger and means for reciprocating the plunger to move the tube from the supporting member on the magazine on to the mandrel of the turntable.

4. In a machine for forming collapsible tubes from tubular bodies, a turntable, a plurality of tube supports on the turntable, and means for imparting a step by step movement to the turntable to bring each of the tube supporting members successively to a plurality of stations, said means comprising a shaft on which the turntable is mounted, an index plate on the shaft, the index plate having a plurality of openings equal in number to the stations of the turntable, an index pin to be received in said openings, means for actuating the index pin, and means for raising and lowering the index plate to bring the openings out of the plane of the pin when the index plate is raised.

5. A machine of the character described comprising a turntable, a plurality of tube supports mounted on the turntable, and means for imparting a step by step movement to the turntable to bring each of the tube supports successively to a plurality of stations, means for raising the turntable to an operable position and lowering it to an indexing position, said means comprising a plurality of seats formed on the bottom of the turntable corresponding to the number of stations, a vertically movable ram having a stroke greater than the vertical movement of the turntable, a pin carried by the ram adapted to be received in one of the seats to raise the turntable as the ram is raised, and being adapted to be removed from the seat by the greater movement of the ram when the ram is lowered, and means for indexing the turntable while in lowered position.

6. In a machine for forming collapsible tubes, a turntable, a plurality of tube supports mounted on the turntable, the turntable being capable of vertical limited movement, a ram for raising the turntable, the ram engaging the turntable to lock it in position when the ram and turntable are raised, the movement of the ram being greater than the movement of the turntable so that the ram and turntable are disengaged when in lowered position, and indexing means for imparting a step by step movement to the turntable while in lowered position, and means for raising and lowering the ram.

7. In a machine for forming collapsible tubes from tubular bodies, a magazine consisting of a disc, a plurality of tube supporting members carried by the magazine near its periphery, the tube supporting members comprising hollow cylinders open at both ends extending upwardly from the disc, equally spaced from the center of the disc, and equally spaced from each other, means for retaining tubes in the tube supporting members, means for imparting a step by step movement to the magazine, a turntable arranged beneath and eccentric to the magazine, a plurality of tube supporting members on the turntable, the tube supporting members of the turntable comprising mandrels extending upwardly from the turntable equally spaced from the center of the turntable and equally spaced from each other, the turntable being spaced from the magazine a sufficient distance to permit the mandrels to pass beneath the magazine, means for imparting a step by step movement to the turntable, one of the tube supporting members of the turntable being arranged beneath one of the tube supporting members of the magazine at one of the stations of each of the turntable and the magazine, and means for transferring a tube from the tube supporting member of the magazine to the tube supporting member of the turntable at said station.

8. In a machine for forming collapsible tubes from tubular bodies, a magazine consisting of a disc, a plurality of tube supporting members carried by the magazine, the tube supporting members comprising hollow cylindrical bodies arranged on the disc near its periphery and concentric of its axis, means for retaining tubes in the tube supporting members, means for imparting a step by step movement to the magazine, a turntable arranged below and eccentric to the magazine, a plurality of mandrels on the turntable and serving as tube supporting members, means for imparting a step by step movement to the turntable, the drive means of the magazine and the drive means of the turntable being synchronized, means at one station for delivering a tubular body from a cylinder of the magazine to a mandrel of the turntable, means for lowering the turntable before each movement of the turntable, and means for raising the turntable after each movement of the turntable.

9. In a machine for forming collapsible tubes from tubular bodies, a magazine consisting of a disc, a plurality of tube supporting members carried by the magazine, the tube supporting members being arranged near the periphery of the disc and concentric to its axis, the tube supporting members comprising hollow cylinders open at both ends, means for retaining tubes in the tube supporting members, means for imparting a step by step movement to the magazine, a turntable arranged beneath and eccentric to the magazine, a plurality of tube supporting members on the turntable, means for imparting a step by step movement to the turntable, one of the tube supporting members of the turntable being arranged beneath one of the tube supporting members of the magazine at one of the stations of each of the turntable and the magazine, and means for transferring a tube from the tube supporting member of the magazine to the tube supporting member of the turntable at said station, holding fingers on the turntable to retain the tubes on the supporting members, one of the stations of the turntable constituting a discharge station, means at the discharge station to release the holding fingers, and means at said station for discharging a tube from a tube supporting member.

References Cited in the file of this patent

UNITED STATES PATENTS

| 286,115 | Chaumont | Oct. 2, 1883 |
| 543,401 | Petterson | July 23, 1895 |
| 1,369,920 | Ennes | Mar. 1, 1921 |
| 1,520,881 | Nielsen | Dec. 3, 1924 |
| 1,729,257 | Horak | Sept. 24, 1929 |
| 1,778,956 | Nelson | Oct. 21, 1930 |

(Other references on following page)

UNITED STATES PATENTS

| | | |
|---|---|---|
| 1,827,553 | Algeo | Oct. 13, 1931 |
| 1,871,915 | Phelps | Aug. 16, 1932 |
| 1,892,475 | Schilling | Dec. 27, 1932 |
| 1,931,294 | Nagy | Oct. 17, 1933 |
| 1,966,877 | Witte | July 17, 1934 |
| 2,001,760 | Barker | May 21, 1935 |
| 2,027,792 | Stokes | Jan. 14, 1936 |
| 2,049,606 | Dyer | Aug. 4, 1936 |
| 2,072,840 | Temple | Mar. 2, 1937 |
| 2,112,119 | Rowe | Mar. 22, 1938 |
| 2,117,713 | Friden | May 17, 1938 |
| 2,138,923 | Johnson | Dec. 6, 1938 |
| 2,169,251 | Johnson | Aug. 15, 1939 |
| 2,206,267 | Schutz | July 2, 1940 |
| 2,207,179 | Schreiber | July 9, 1940 |
| 2,235,345 | Westin | Mar. 18, 1941 |
| 2,241,091 | Hood | May 6, 1941 |
| 2,341,144 | Hill | Feb. 8, 1944 |
| 2,341,554 | Johnson | Feb. 15, 1944 |
| 2,344,930 | Ferguson | Mar. 21, 1944 |
| 2,349,456 | Olson | May 23, 1944 |
| 2,352,816 | Weightman | July 4, 1944 |
| 2,359,384 | Poole | Oct. 3, 1944 |
| 2,361,001 | Anderson | Oct. 24, 1944 |
| 2,390,533 | Hill | Dec. 11, 1945 |
| 2,394,837 | Bartelheim | Feb. 12, 1946 |
| 2,395,200 | Smiley | Feb. 19, 1946 |
| 2,425,170 | Wunsch | Aug. 5, 1947 |
| 2,465,677 | Deverall | Mar. 29, 1949 |
| 2,498,009 | Schrader | Feb. 21, 1950 |